US009009186B2

(12) United States Patent
    Tarbet

(10) Patent No.: US 9,009,186 B2
(45) Date of Patent: Apr. 14, 2015

(54) GENERATION AND PROVISION OF DIRECTED SALES INCENTIVES AT LOCATIONS REMOTE FROM THE POINT OF SALE

(71) Applicant: Safeway Inc., Pleasanton, CA (US)

(72) Inventor: Kenneth H. Tarbet, Woodinville, WA (US)

(73) Assignee: Safeway Inc., Pleasanton, CA (US)

( * ) Notice: Subject to any disclaimer, the term of this patent is extended or adjusted under 35 U.S.C. 154(b) by 0 days.

(21) Appl. No.: 13/685,492

(22) Filed: Nov. 26, 2012

(65) Prior Publication Data

US 2013/0173385 A1    Jul. 4, 2013

Related U.S. Application Data

(63) Continuation of application No. 09/888,031, filed on Jun. 25, 2001, now abandoned.

(60) Provisional application No. 60/213,440, filed on Jun. 22, 2000.

(51) Int. Cl.
    *G06F 17/30*      (2006.01)
    *G06Q 30/02*      (2012.01)

(52) U.S. Cl.
    CPC ...... *G06Q 30/0251* (2013.01); *G06F 17/30867* (2013.01); *G06F 17/30864* (2013.01)

(58) Field of Classification Search
    CPC .............. G06F 17/30864; G06F 17/30867; G06Q 30/0251
    USPC ............ 705/7, 14.49, 15, 27, 32, 10; 707/767
    See application file for complete search history.

(56) References Cited

U.S. PATENT DOCUMENTS

| 3,959,624 | A |   | 5/1976  | Kaslow |
| 4,124,109 | A |   | 11/1978 | Bissell et al. |
| 4,412,631 | A |   | 11/1983 | Haker |
| 4,554,446 | A |   | 11/1985 | Murphy et al. |
| 4,674,041 | A |   | 6/1987  | Lemon et al. |
| 4,723,212 | A |   | 2/1988  | Mindrum et al. |
| 4,882,675 | A |   | 11/1989 | Nichtberger et al. |
| 5,418,713 | A | * | 5/1995  | Allen ............................. 705/32 |
| 5,649,114 | A | * | 7/1997  | Deaton et al. ............. 705/14.35 |
| 5,758,337 | A | * | 5/1998  | Hammond ................... 707/669 |

(Continued)

FOREIGN PATENT DOCUMENTS

| WO | 8501373 A1 | 3/1985 |
| WO | 9923585 A1 | 5/1999 |

OTHER PUBLICATIONS

Advisory Action dated Nov. 6, 2006, 3 pages, U.S. Appl. No. 09/888,031, filed Jun. 25, 2001.

(Continued)

*Primary Examiner* — Shahid Alam
(74) *Attorney, Agent, or Firm* — Conley Rose, P.C.; Jerry C. Harris, Jr.

(57) ABSTRACT

This invention is directed to a system and method for improving customer loyalty through direct sales incentive dissemination based on the customers past purchase history and items the store is offering at a reduced price. The additional services include providing the customer with a list of their preferred items, which are also on sale, without the customer needing to search for related coupons and the like.

11 Claims, 24 Drawing Sheets

(56) References Cited

U.S. PATENT DOCUMENTS

| | | | |
|---|---|---|---|
| 5,940,818 A | 8/1999 | Malloy et al. | |
| 6,003,024 A * | 12/1999 | Bair et al. | 707/669 |
| 6,052,667 A * | 4/2000 | Walker et al. | 705/15 |
| 6,763,353 B2 * | 7/2004 | Li et al. | 719/320 |
| 6,871,187 B1 * | 3/2005 | Gosko | 705/26.8 |
| 6,965,868 B1 | 11/2005 | Bednarek | |
| 6,970,874 B2 * | 11/2005 | Egilsson et al. | 707/803 |
| 7,213,005 B2 * | 5/2007 | Mourad et al. | 705/64 |
| 2001/0014868 A1 | 8/2001 | Herz et al. | |
| 2002/0099577 A1 * | 7/2002 | Black | 705/7 |
| 2003/0036974 A1 * | 2/2003 | Allen | 705/27 |
| 2003/0055707 A1 * | 3/2003 | Busche et al. | 705/10 |
| 2004/0210549 A1 | 10/2004 | Tarbet | |

OTHER PUBLICATIONS

Advisory Action dated Sep. 18, 2007, 3 pages, U.S. Appl. No. 09/888,031, filed Jun. 25, 2001.

Office Action dated Nov. 15, 2005, 13 pages, U.S. Appl. No. 09/888,031, filed Jun. 25, 2001.

Office Action (Final) dated Aug. 24, 2006, 9 pages, U.S. Appl. No. 09/888,031, filed Jun. 25, 2001.

Office Action dated Jan. 30, 2007, 10 pages, U.S. Appl. No. 09/888,031, filed Jun. 25, 2001.

Office Action (Final) dated Jul. 13, 2007, 8 pages, U.S. Appl. No. 09/888,031, filed Jun. 25, 2001.

Office Action (Final) dated Oct. 17, 2008, 10 pages, U.S. Appl. No. 09/888,031, filed Jun. 25, 2001.

Office Action dated Apr. 30, 2008, 8 pages, U.S. Appl. No. 09/888,031, filed Jun. 25, 2001.

Provisional patent application entitled "Customer Preferred Product Sales," by Kenneth H. Tarbet filed Jun. 22, 2000 as U.S. Appl. No. 60/213,440.

Decision on Appeal dated Jul. 11, 2012, 9 pages, U.S. Appl. No. 09/888,031, filed Jun. 25, 2001.

Decision on Request for Rehearing dated Sep. 20, 2012, 5 pages, U.S. Appl. No. 09/888,031 filed Jun. 25, 2001.

Examiner's Answer dated Jul. 8, 2009, 12 pages, U.S. Appl. No. 09/888,031 filed Jun. 25, 2001.

* cited by examiner

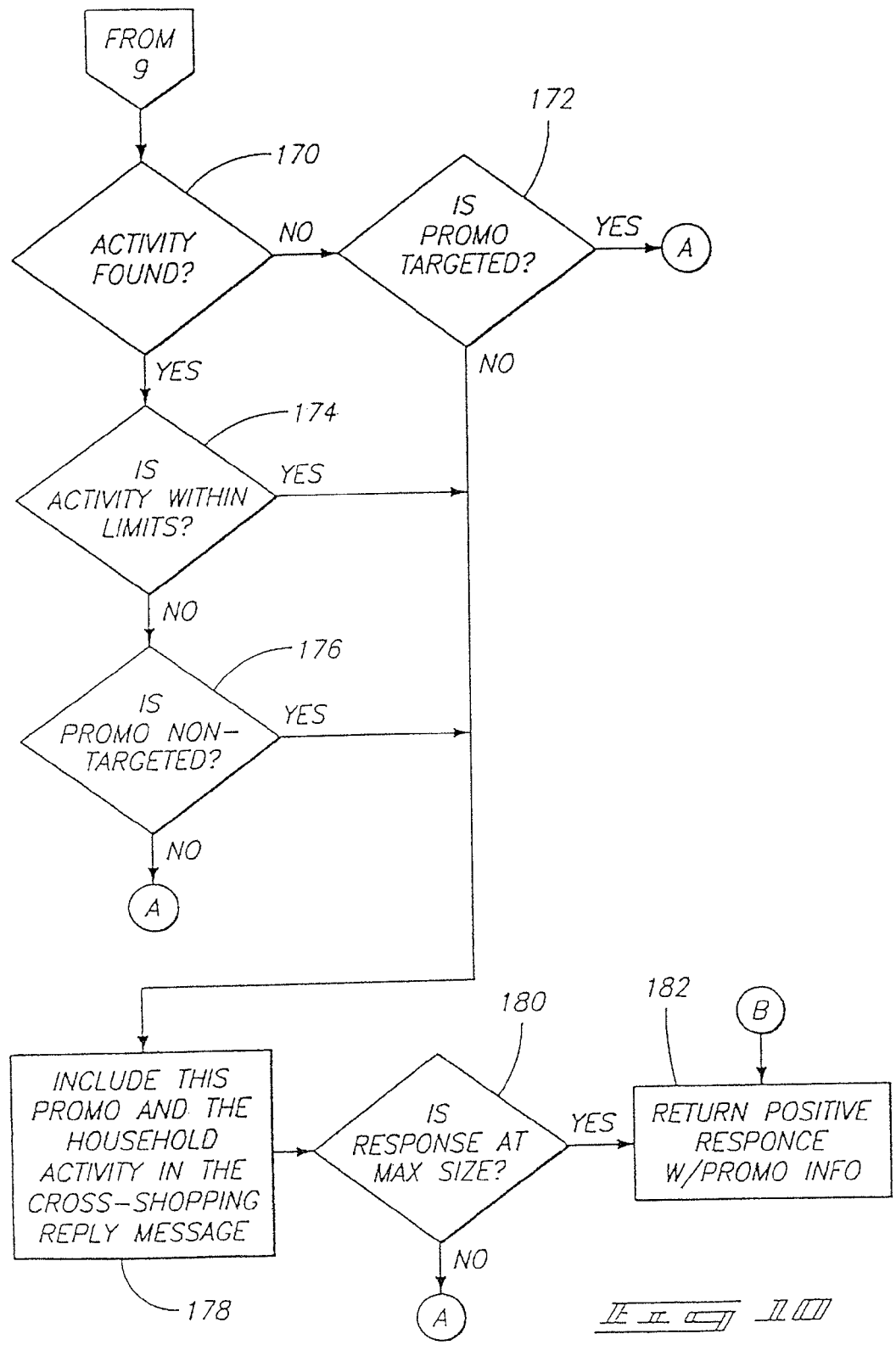

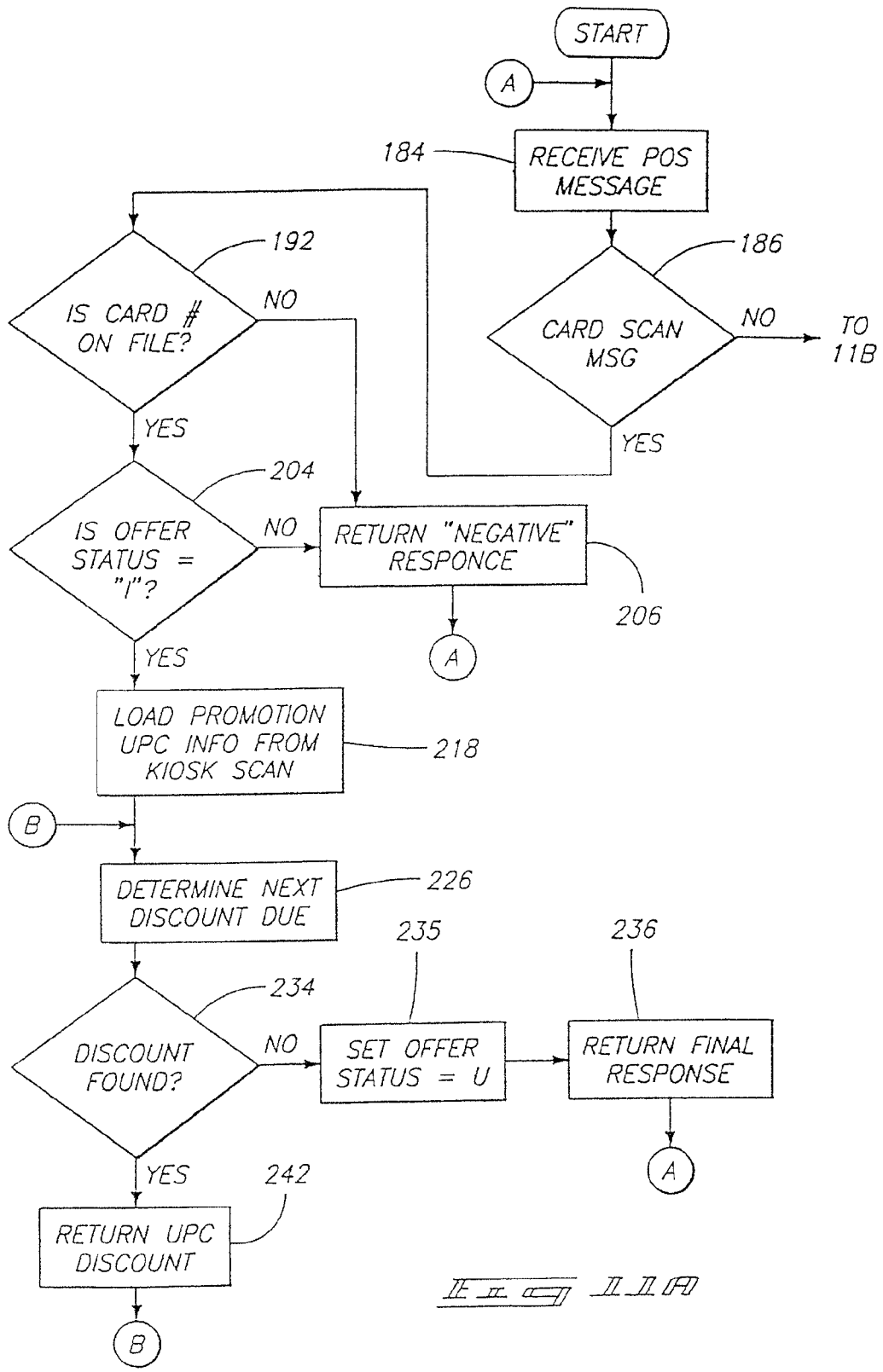

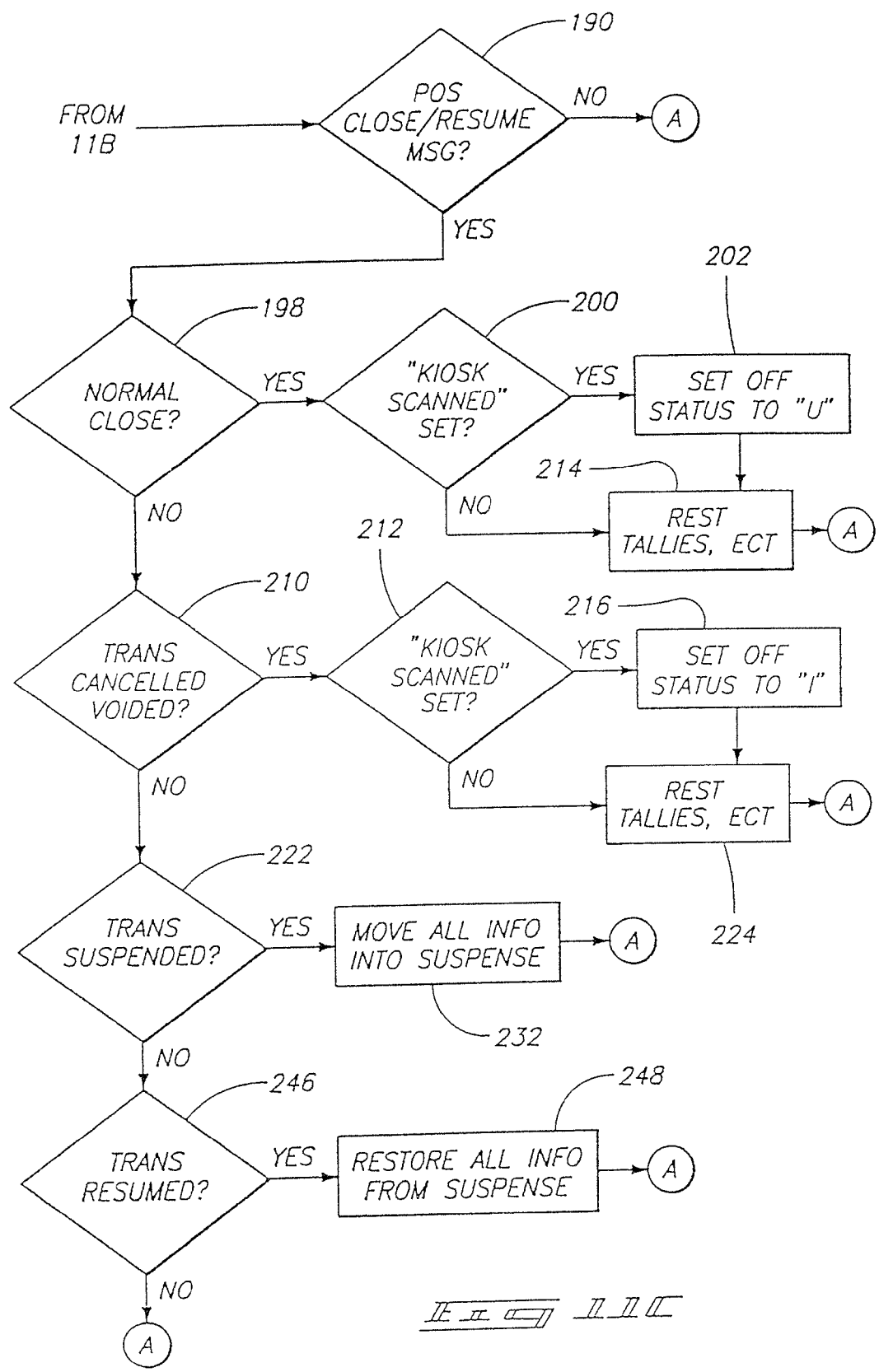

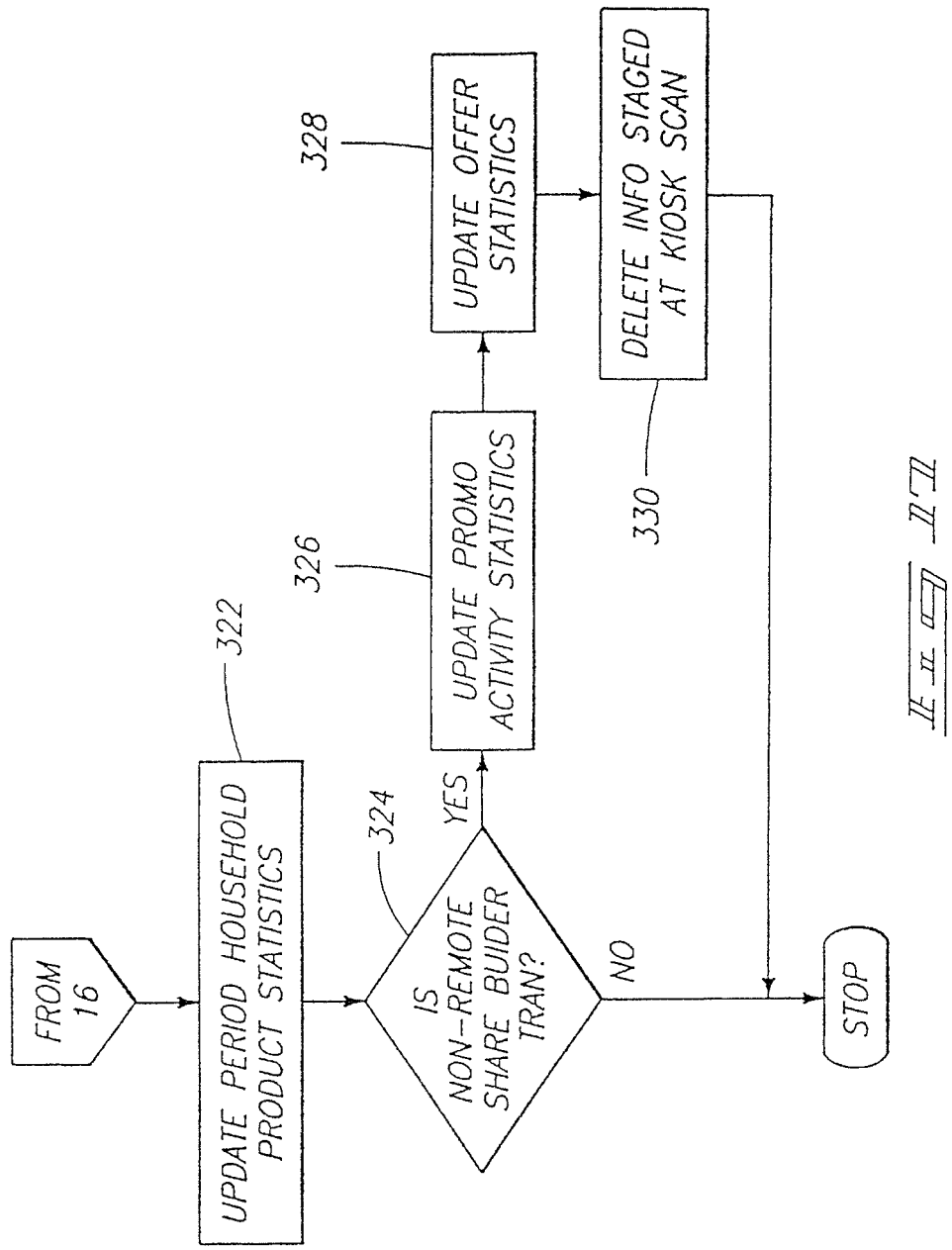

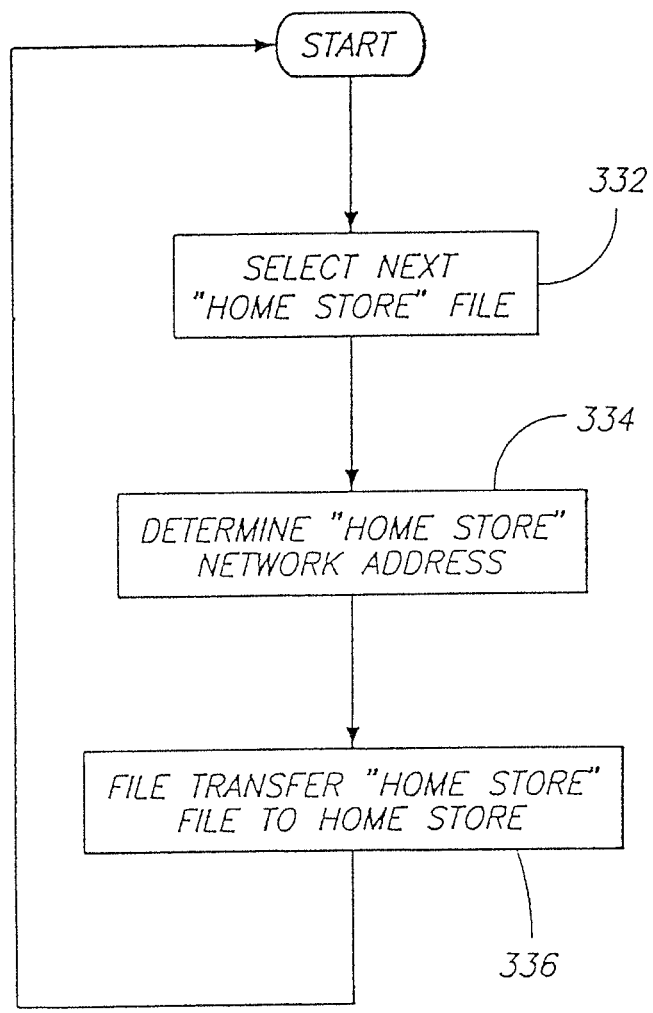

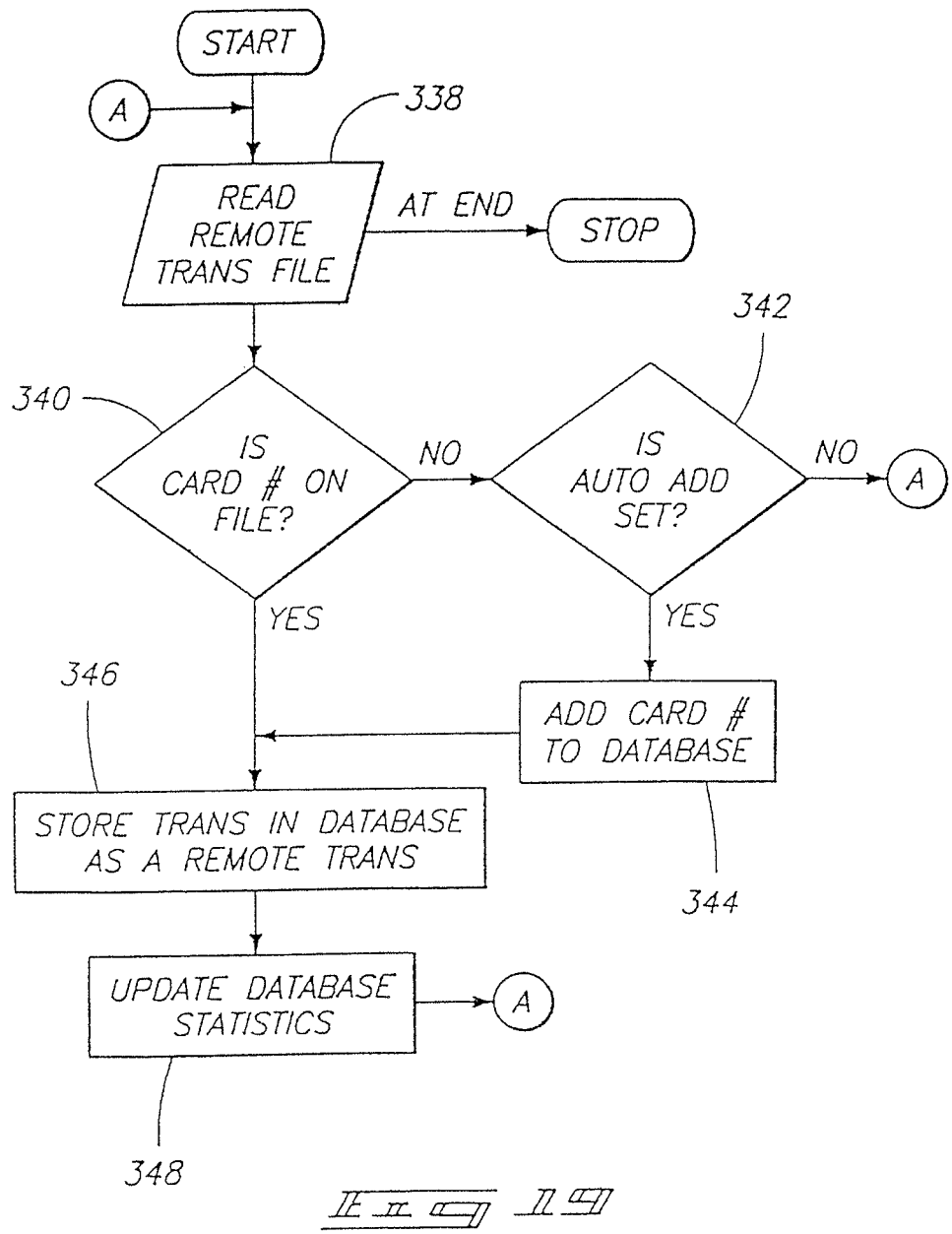

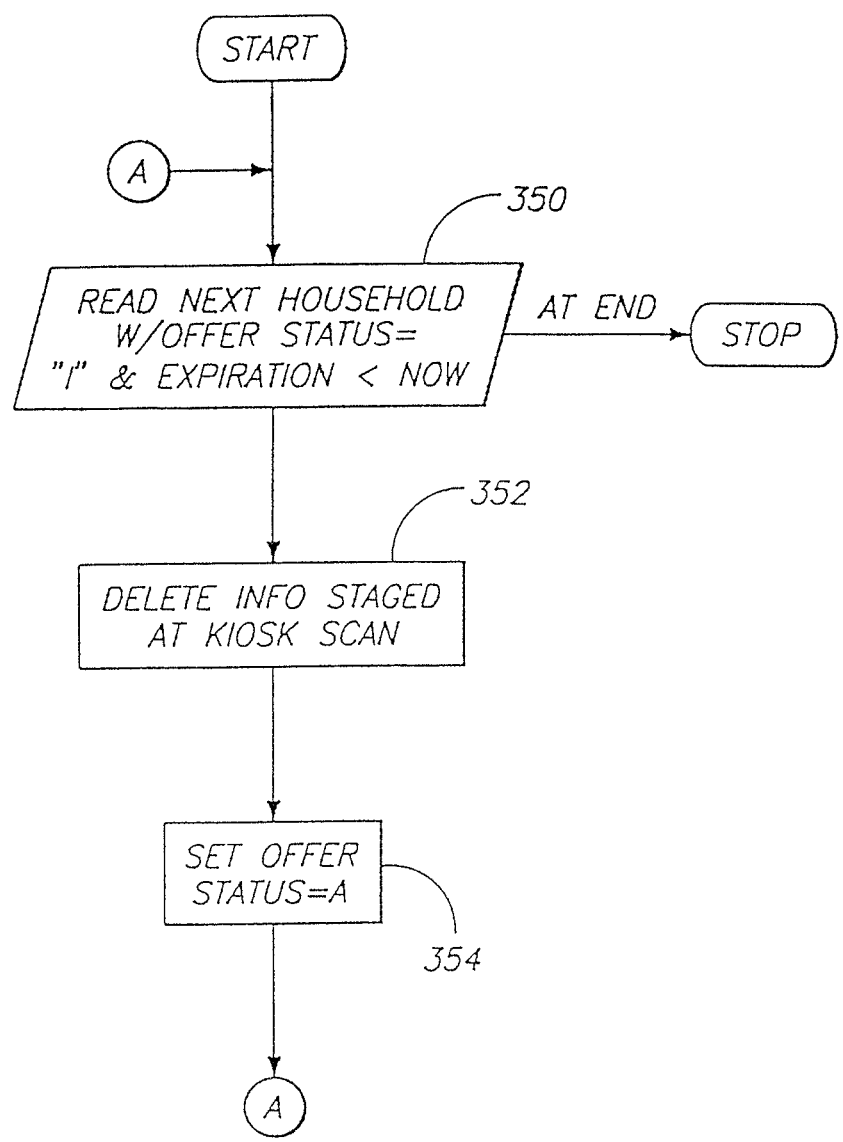

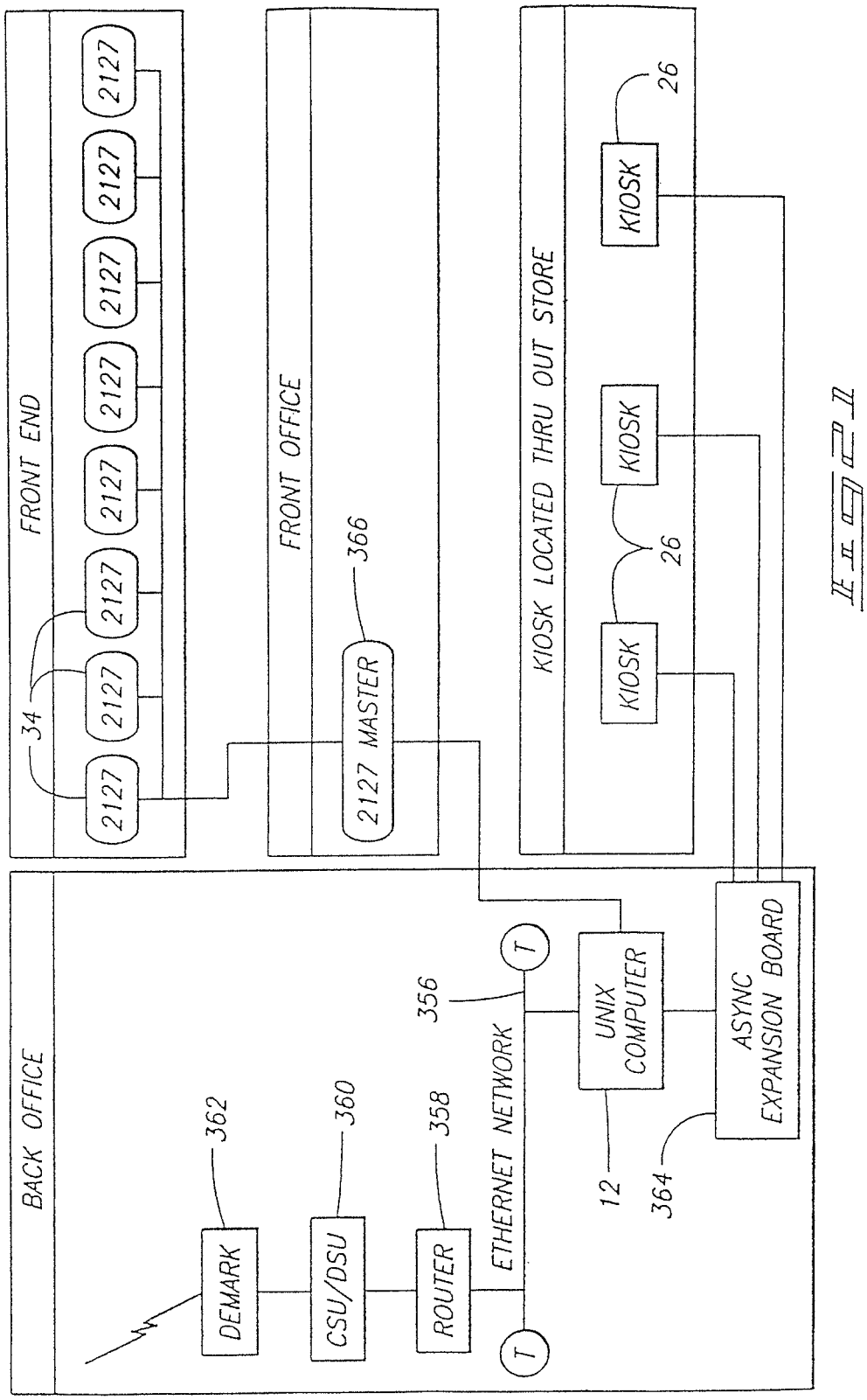

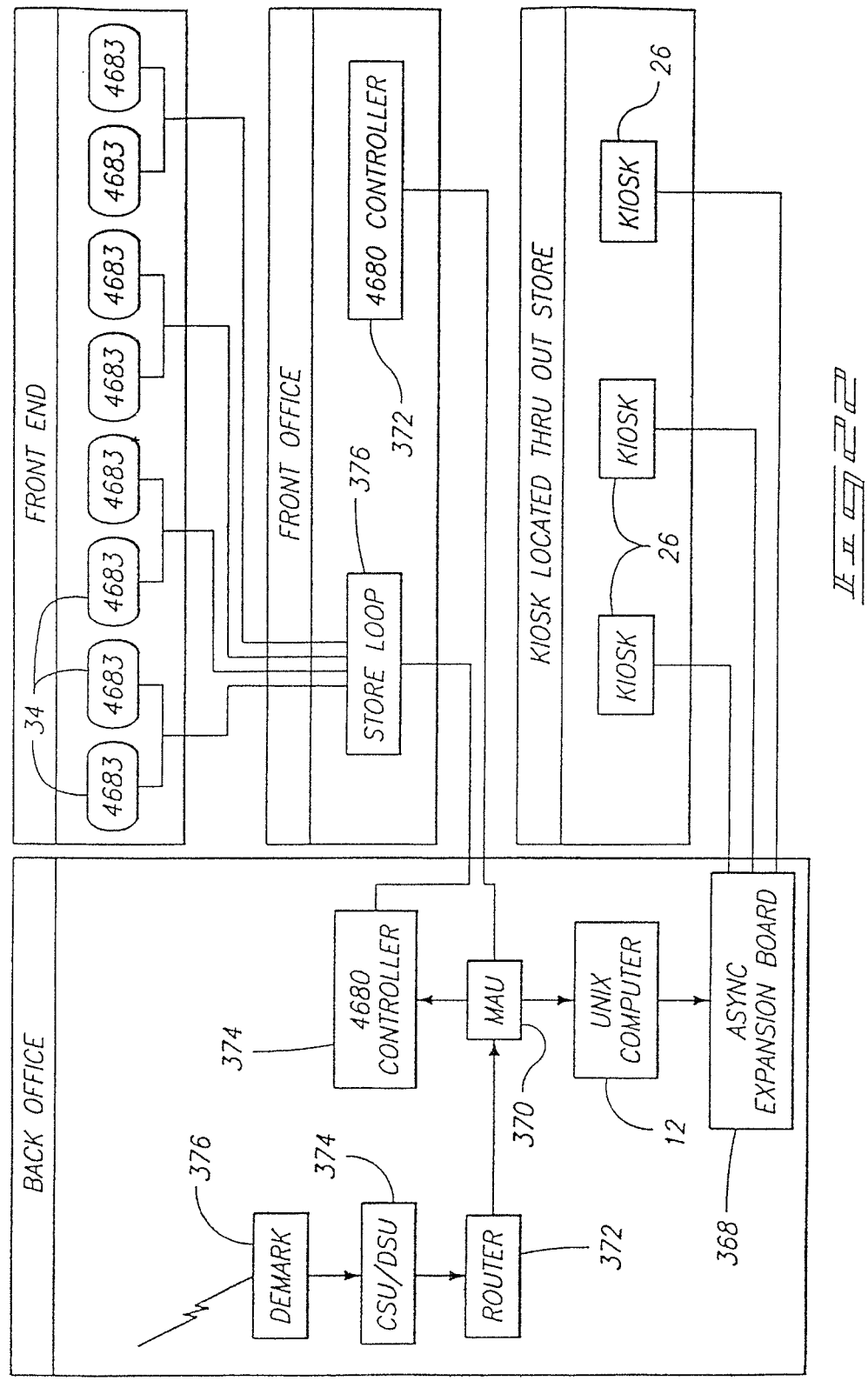

GENERATION AND PROVISION OF DIRECTED SALES INCENTIVES AT LOCATIONS REMOTE FROM THE POINT OF SALE

CROSS-REFERENCE TO RELATED APPLICATION

This application is a continuation of and claims priority to U.S. patent application Ser. No. 09/888,031 filed on Jun. 25, 2001 and published as US 2004/0210549 A1, which claims priority to U.S. Provisional Application No. 60/213,440 filed Jun. 22, 2000 and entitled "Directed Sales Incentives," which applications are incorporated by reference herein in their entirety.

TECHNICAL FIELD

The invention relates to a point of sale marketing and purchase behavior monitoring as well as methods for paperless delivery of sales incentives to selected customers.

BACKGROUND OF THE INVENTION

It is known to provide coupons to consumers in order to attempt to influence their purchasing behavior, for example to entice them to try a new product. Such coupons are typically made available to the general public by mailing coupon packages to large numbers of people, or by including coupons in newspapers. A problem with using such coupons is that there is a possibility of fraudulent use. It may be possible for a retailer to receive cash for coupons even though they did not sell a manufacturer's product. It may be possible for a consumer to exceed discount limitations per consumer by shopping at multiple different stores. A cashier may not be able to carefully follow the rules associated with a coupon, such as rules requiring a purchaser to buy a certain quantity of the product to be eligible for the discount.

Another problem with using coupons or price discounting is an inability to target a specific segment of the market. Instead, the coupons or discounts are provided to a large number of consumers, many of whom have no interest whatsoever in the particular type of product. For example, consumers who do not own pets would have no interest in pet food coupons or discounts; consumers who do not have a baby would not be interested in coupons or discounts for baby food or items; vegetarians would not be interested in coupons or discounts for meat, etc. Thus, a great quantity of advertising is wasted on people who have no interest in the items being offered.

Another disadvantage of the current coupon system is the great expense in having a clearing house through which coupons are physically delivered for redemption. Associated therewith are handling costs incurred by the national store, clearinghouse, and manufacturer. These costs are typically borne by the manufacturer or other distributor of the product. Further, there are circumstances in which a retailer or manufacturer would only be interested in offering coupons to certain consumers, such as to reward repeat purchasers or quantity purchasers, or to entice consumers of competitors products to switch brands. The retailer or manufacturer may have a limited budget and may only be interested in providing coupons to consumers who purchase goods of a certain type, or in a certain quantity. This is difficult or impossible using most or all prior systems.

It is also known to generate and sell mailing lists of consumers who have certain tendencies or who purchase certain items. People who purchase items by mail order quickly find themselves receiving catalogs and information from other retailers who sell similar or related products. Mailing lists are valuable because they provide useful information about consumers, and permit targeted marketing. It would be valuable to be able to collect information about buying habits of particular individuals other than just those who purchase through mail order services. U.S. Pat. No. 4,882,675 (incorporated by reference) discloses a paperless coupon system. Consumers each have a card having thereon a UPC code. The consumers access a terminal and make selections from possible available coupons prior to beginning shopping. A shopping list of coupons is then presented to the consumer. There is a link to check-out stations, and discounts selected by the consumer are subtracted from the consumers total bill. Optionally, data regarding the consumers purchases is captured. U.S. Pat. No. 4,723,212 (incorporated by reference) discloses a system for printing coupons when a consumer purchases a competitor's product.

U.S. Pat. No. 4,674,041 (incorporated by reference) and WO85/01373 disclose systems including terminals which receive magnetic cards, and which dispense coupons available to a particular consumer. The terminals communicate with a host computer, and the system provides for overall limits on a discount throughout the entire terminal system so that a manufacturer can put a maximum cap or limit on a promotion for the entire terminal system. Coupons per store can be limited as well.

U.S. Pat. No. 4,412,631 (incorporated by reference) discloses dispensed cards which are used for imprinting onto coupons. This reduces the opportunity for fraud.

U.S. Pat. No. 4,124,109 discloses a coupon dispenser which receives a card having a magnetic strip, which card includes indicia indicating the last time it was used.

U.S. Pat. No. 3,959,624 (incorporated by reference) discloses coupons having UPC bar codes thereon. The UPCs on coupons presented at check-out time must match UPCs for products purchased before discounts will be applied to a consumer's bill. Similarly, U.S. Pat. No. 4,554,446 (incorporated by reference) discloses scannable coupons. A system including a supervisory computer communicating with store level computers, and providing for targeted special offers was is installed for experimental testing in a joint development arrangement in June, 1994.

SUMMARY OF THE INVENTION

This invention is directed to a system and associated methods for direct marketing and directed sales incentive dissemination to selected customers. One aspect of the invention is directed to a method for furthering customer loyalty through increased service to the customer. This aspect is further explained and envisioned to include methods whereby a customer is assisted in knowing when items that they normally purchase are at a reduced sale price. An additional, yet related aspect of this invention is the use of a paperless method for communicating their sales incentive to them, such as through email or other paperless methods.

BRIEF DESCRIPTION OF THE DRAWINGS

Preferred embodiments of the invention are described below with reference to the accompanying drawings, which are briefly described below.

FIGS. 6-10 are flow charts illustrating activity at a kiosk which a customer uses to obtain a list of special offers.

FIGS. 15-17 are flow charts illustrating updating of database statistics.

FIG. 18 is a flow chart illustrating file transfer to a home store.

FIG. 19 is a flow chart illustrating remote transaction analysis.

FIG. 20 is a flow chart illustrating deletion of expired special offers.

FIG. 21 is a block diagram illustrating hardware components and cabling for a store employing NCR (trademark) check-outs.

FIG. 22 is a block diagram illustrating hardware components and cabling for a store employing IBM (trademark) check-outs.

DETAILED DESCRIPTION OF THE PREFERRED EMBODIMENTS

Figure 1:
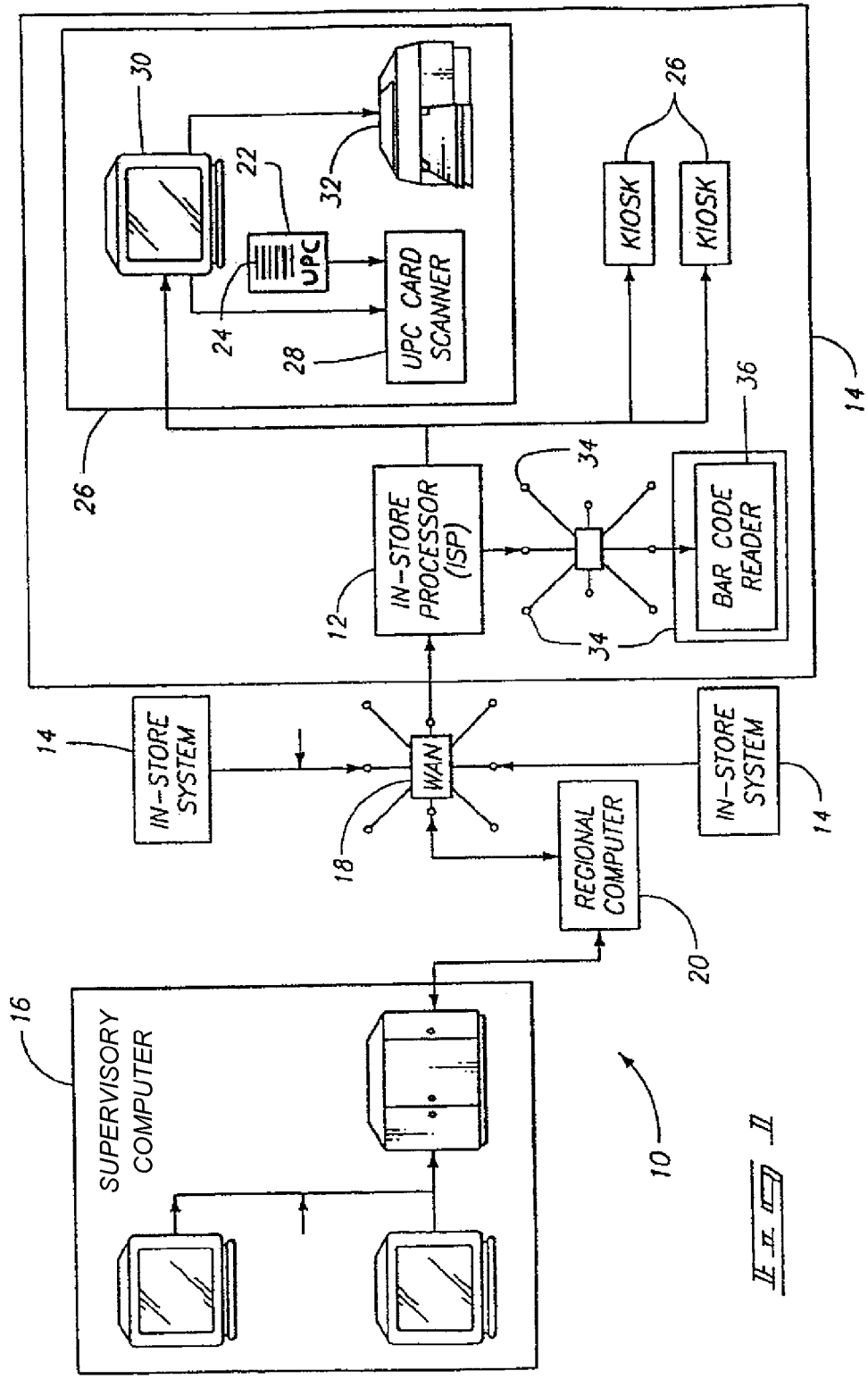
FIG. 1 is a block diagram of a system embodying the invention.

In a first embodiment of the present invention is a system adapted to facilitate a method of improving customer relations comprising:

comparing a first database with a second database and determining therefrom commonalties thereby, producing a third database, wherein the first database contains inventory items of a store, and where the second database contains consumer-selected items and where the third database is the intersection of the first database and the second database. Whereby the third database contains records or entries for items purchased by the store's customers which, are also stored within the first database. The store inventory items, which may be a table in the first database is preferably a subset of another table, but is the group of items currently offered for sale at a reduced price.

In one embodiment, the first database will contain at least two tables. One table will be the items offered for sale by the store and the second table will be the items offered for sale by the store, at a time limited, yet reduced or promotional sales price. The third database is thereby the intersection between the store's incentive products and the customer's normal purchases.

In another embodiment, the second database also has multiple tables and further contains preferred purchases organized according to holiday, such as Christmas, New Year, Hanukah and others.

In addition to these and other envisioned embodiments, the present invention provides an incentive list to a customer of items presently offered at a reduced price at the customer's preferred store. Where desired this list may further include future, yet potential, incentive prices and items for the customer's organizational benefit. In this manner, the store is assisting the customer in scheduling and organizing family food expenses. This same goal may be further pursued through communication of nutritionally balanced meals or diet/calorie conscious meals or cholesterol level conscious meals or other similar "specialty" meal types as a customer's needs demand. These proposed meals will include a list of incentive items meeting the designated criteria, including cost and other constraints.

This invention further may be practiced as a method for loyal customer service and directed marketing comprising:

(a) determining a product database for storing a product information related to a product;

(b) determining a purchase database for storing a purchase information related to the purchase of the product by a customer;

(c) determining a customer database for storing the customer information related to the customer where said customer information at least provides for each customer in said customer database an association with the purchase database;

(d) determining a promotion database for storing a promotion information related to a promotion of the product, where said promotion relates to individual products and where said promotion is determined independent of said customer information;

(e) determining a customer incentive database for storing the intersection of the promotion database, the purchase database and the customer database, where the customer database is arranged by the customer information thereby providing a customer incentive report; and (f) communicating said customer incentive report to the customer.

The system 10 further includes a plurality of cards 22. Each card has thereon machine readable information for associating the card with particular customer and customer account, and with a particular store in the chain. In the illustrated embodiment, the card 22 has thereon a UPC code 24. The UPC code identifies the customer and identifies the customer's home store. Every customer has a home store where they set up their account, and where some of their records relating to their purchase behavior are kept. In alternative embodiments, the machine readable information of the card 22 is contained in a magnetic strip, or the card 22 is a smart card. Any other suitable means of storing information in a card can be employed. Similarly, any other means of identifying a customer can be employed instead of the cards and the card readers described below (e.g., passwords, fingerprint scans, retinal scans, etc. are employed in alternative embodiments). At least one kiosk 26 is placed in each store 14. The kiosk 26 is a booth or housing. Preferably, at least one kiosk 26 is located near the entrance of the store 14. One or more additional kiosks can be located in other parts of the store frequented by customers. The system 10 further comprises a customer interface 28 housed in each kiosk 26 and in communication with the store level computer 12 associated with the store in which the kiosk 26 is located. In the illustrated embodiment, the customer interface comprises a card reader 28 including means for reading the machine readable information on the card, for sending information from the card to the store level computer 12 of the store where the kiosk is located. In the illustrated embodiment, the customer interface comprises a dumb terminal 30 connecting the card reader 28 to the store level computer 12. Other customer interfaces can be employed, such as interactive terminals, touch screen interfaces, etc. The kiosk 26 also houses an offer communicator (offer communicator means) 32 for communicating respective individualized lists of special offers to customers who access the customer interface. While various offer communicators could be employed, in the illustrated embodiment the offer communicator comprises a printer. The printer 32 is preferably a high speed printer, such as a thermal printer, so as to enable quick processing of customers at the kiosk 26 to keep lines at the kiosk 26 down to a minimum. The system 10 further comprises one or more check-outs or point-of-sale terminals 34 in each store. These are spaced apart from the kiosks 26, which are preferably located in a different area of the store. The check-outs 34 in a store are in communication with the store level computer 12 associated with the same store. The check-outs 34 include readers which read the cards 22 in addition to products. More particularly, in the illustrated embodiment, the check-outs 34 include bar code readers which read UPC codes on the products, as well as UPC codes 24 on the cards 22. In operation, a customer sets up an account with a store and receives one of the cards 22. Then, whenever the customer goes shopping, he or she may go to one of the kiosks before beginning shopping and presents the card 22 to the customer interface 28. The store level computer 12 includes means for accessing information about the special offers available to the customer associated with the card, and generates a customized list of special offers available to that particular customer. More particularly, the computer 12 determines what special offers are available to this customer, and sends a list of special offers to the offer communicator 32. The customer then has a shopping list of special offers to use while shopping. The customer does not engage in any selection process, but instead is quickly processed at the kiosk.

The first few times the customer uses the card 22, the computer 12 will have little information about the customer's buying habits. Therefore, the special offers available to that customer may not contain many targeted special offers. To keep the customer interested in using the card, while purchasing behavior information is being obtained, the customer will be given broadcast special offers, which are special offers available to everyone and are of general interest, such as dairy products and the like. In addition, the customer may be entitled to a frequent shopper plan (similar to frequent flyer plans) if he or she uses the card 22. The frequent shopper plan awards points based on amount of use of the card 22 or based on amounts spent in the store.

After the customer finishes shopping, the customer presents his or her card 22 to the check-out 34, where the card 22 is scanned before or while purchases are rung up. The system 10 includes means for associating a purchased product with a customer account if one of the cards 22 is scanned by the bar code reader 36 in sequence with scanning of products. More particularly, a list of all products for which special offers exist for at least one customer is downloaded from the store level computer to the check-out 34 at appropriate times, after special offer programs are initiated. The check-out 34 then has a list of all products for which discounts may be available to certain customers. If a customer purchases a product which is included in this list, the check-out 34 communicates with the store level computer 12 to determine if a special offer is available to the particular customer whose card 22 was scanned by the check-out 34 in sequence with the products, and to determine the value of the special offer. The check-out 34 applies any special offers available to that customer to the customer's total if the customer purchased products for which special offers were available. In one embodiment, if a product that is currently on promotion is scanned at the check-out 34 before the customer's card 22 is scanned, the check-out register 34 communicates the purchase to the store level computer 12 but does not necessarily wait for a response from the store level computer 12. If or when the customer card 22 is finally scanned at the check-out register 34 as part of the shopping trip, the check-out 34 communicates the card number of the customer card 22 to the store level computer 12. The store level computer 12 then communicates to the check-out register 34 each discount that the consumer qualified for because of the product purchases made in this shopping trip prior to the scan of the customer card 22. Subsequent discounts are then received by the check-out 34 immediately following the scan of a qualifying product, as previously presented.

Special offers that were accepted by the customer, and that are restricted to a certain quantity of product, will not be available to the customer the next time the customer accesses the kiosk 26 if the quantity limit has been reached. The check-out sends to the computer 12 information regarding all purchases made by the customer. Optionally, members of a household could be treated as a single customer, so that they can take advantage of combined purchasing power. The members of the household would then all have cards associating them with the same customer account in the computer 12. The computer 12 identifies which customers should be treated as a household, such as if two customers have the same address. Thus, the two customers that should belong to the same household can optionally be given the option of being treated as a household. Members of a same household may opt out of being treated as a single household. For example, college students living at home may not be interested in targeted special offers that are made to the rest of the household. If the household has a baby, the college students may not be interested in obtaining targeted special offers relating to baby food or supplies.

The system 10 maintains and may communicate to each customer who uses a card 22 a comparison of current incentive items to the price for the same items at competitive stores.

In another preferred embodiment, system 10 will communicate the best price available for the list of consumer's preferred items, regardless of whether that price is available through a competitor.

If a customer uses his or her card 22 at a customer interface 28 in a store other than their home store, the store level computer 12 communicates with the customer's home store and the customer's account is accessed even though the customer is not in his or her home store. Thus, the customer can obtain a list of special offers even when shopping at another store of a chain of stores.

The supervisor computer 16 further comprises means for generating a report of the effectiveness of special offers (including targeted special offers) in causing customers to purchase products. For example, a manufacturer may want to know whether a targeted special offer increased their sales. Because the store level computers maintain records of purchase behavior, the supervisory computer 16 is capable of printing out reports of whether targeted special offers were accepted, and with what amount of success. NOTE: Records of purchase behavior may be maintained at the customer's home store system 14, at a regional computer system 20, at the supervisory computer 16, or at any combination of these computer locations. The "closest" record system will always be accessed by the system 10, as required.

The system 10 also provides for the possibility of presenting special offers based on repurchase cycles. If a customer just bought a product, a targeted special offer can be presented to that customer at a time when it is expected that the customer would run out of the product and would need to purchase more of the product. The system 10 provides many advantages. The likelihood of special offers being accepted is higher than if paper coupons are used. There is no need to select, clip, and carry coupons. Control over timing of special offers is increased. Statistical analysis of customer behavior can be performed.

According to the present system and associated methods, the store provides additional services to its customers by assisting in knowing of and selecting items they want and normally by anyway at incentive prices.

Various detailed flow charts are provided which illustrate logic employed in one embodiment of the invention. This application is intended to cover broader aspects of the invention. The description of the flow charts is provided merely to better enable one of ordinary skill in the art to implement the invention without undue experimentation.

Figure 2:
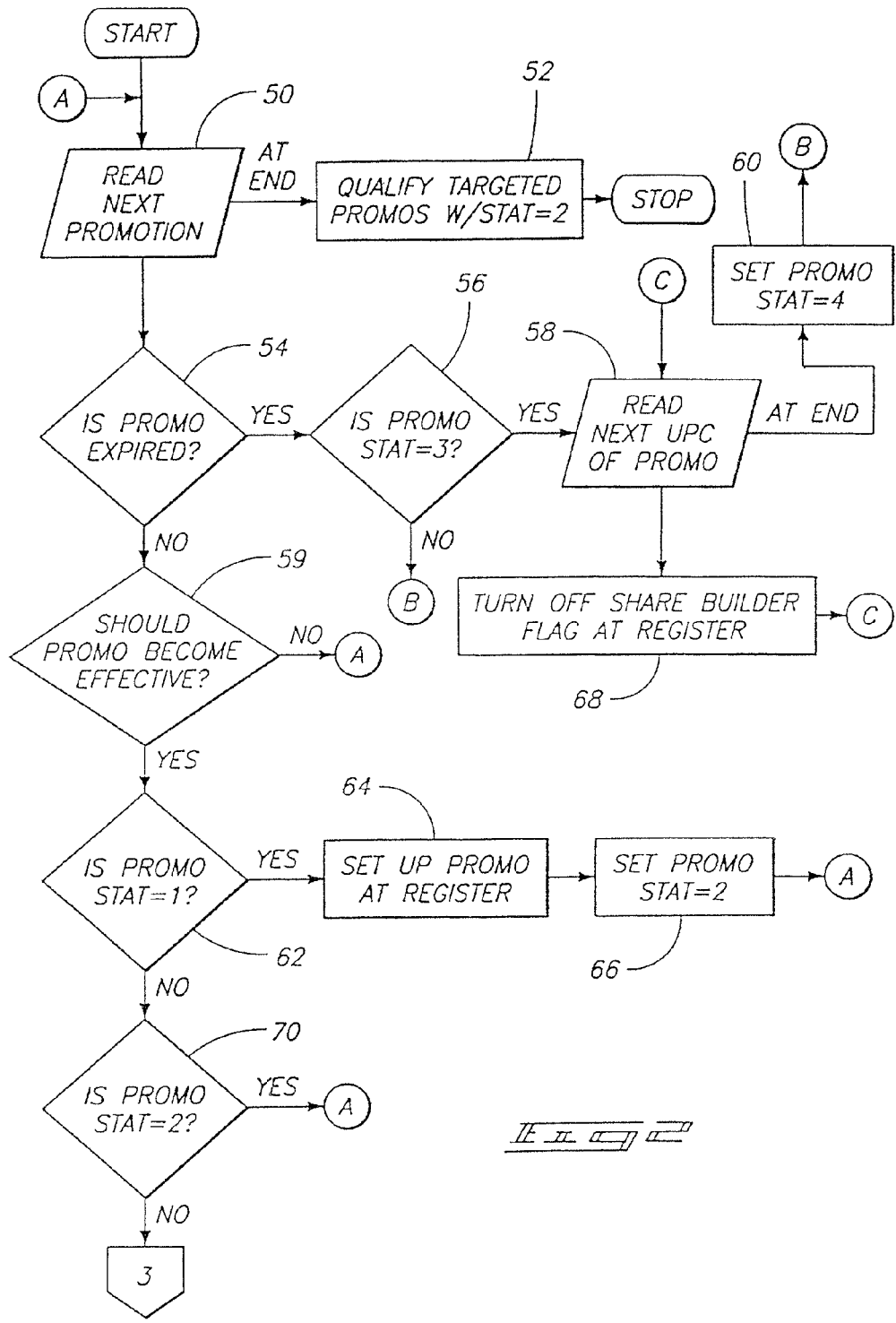
FIGS. 2-3 are flow charts illustrating store level special offer (promotional) staging.
Figure 3:
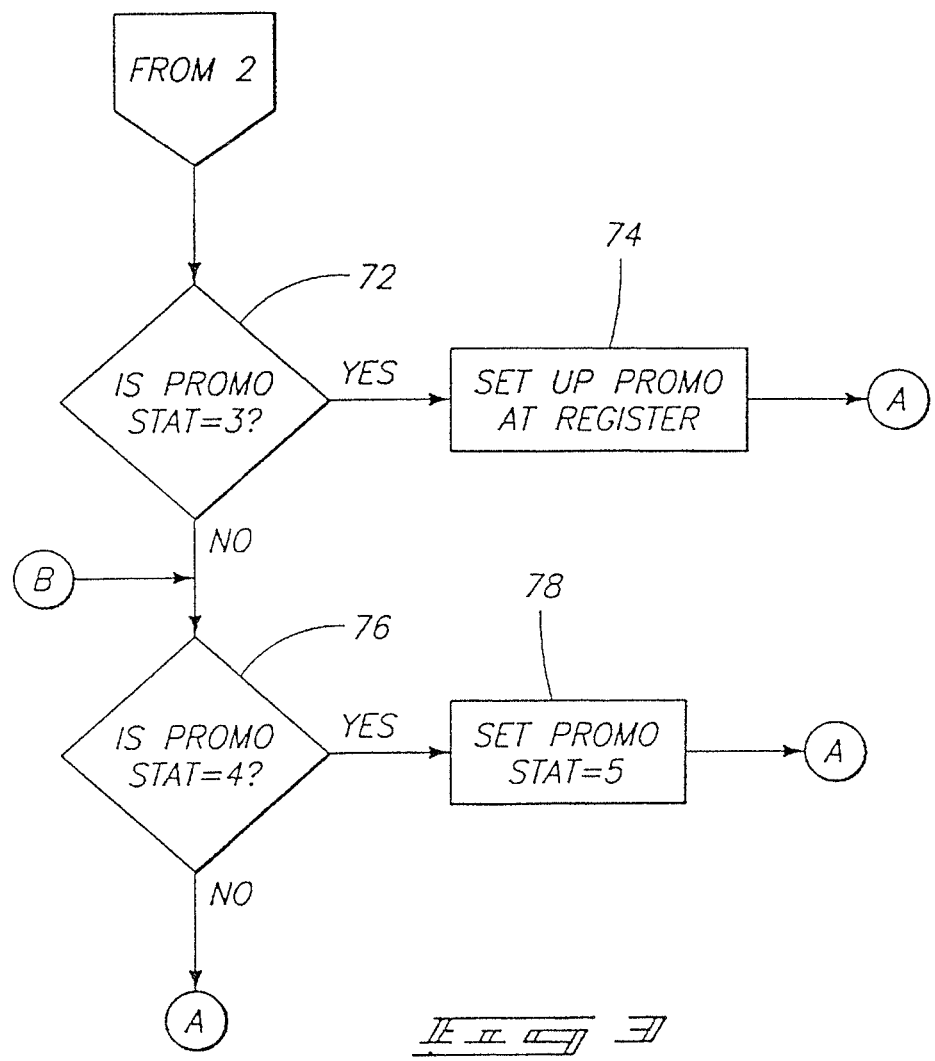
Figure 4:
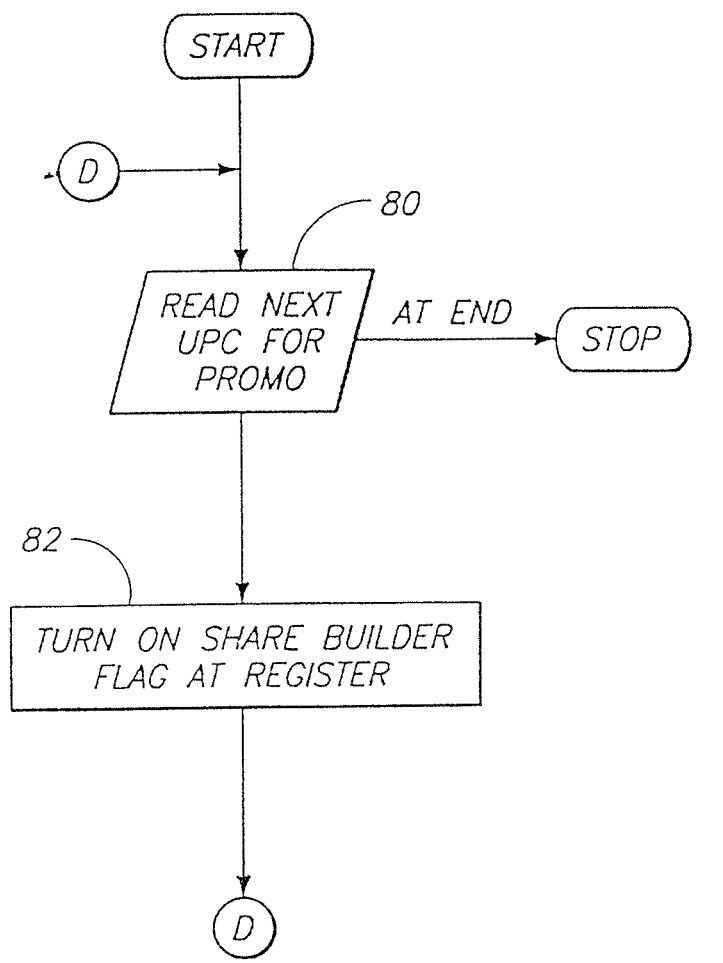
FIG. 4 is a flow chart illustrating a promotion set up at a check-out register.
Figure 5:
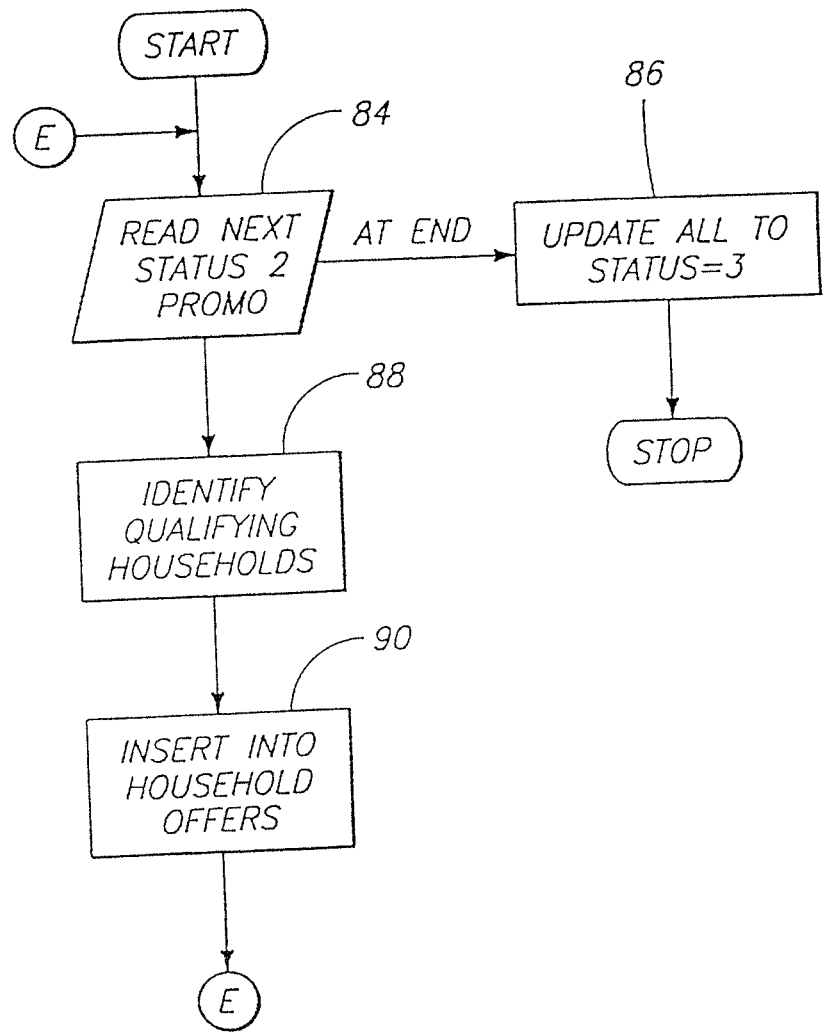
FIG. 5 is a flow chart illustrating identifying customers qualifying for special offers.
Figure 6:
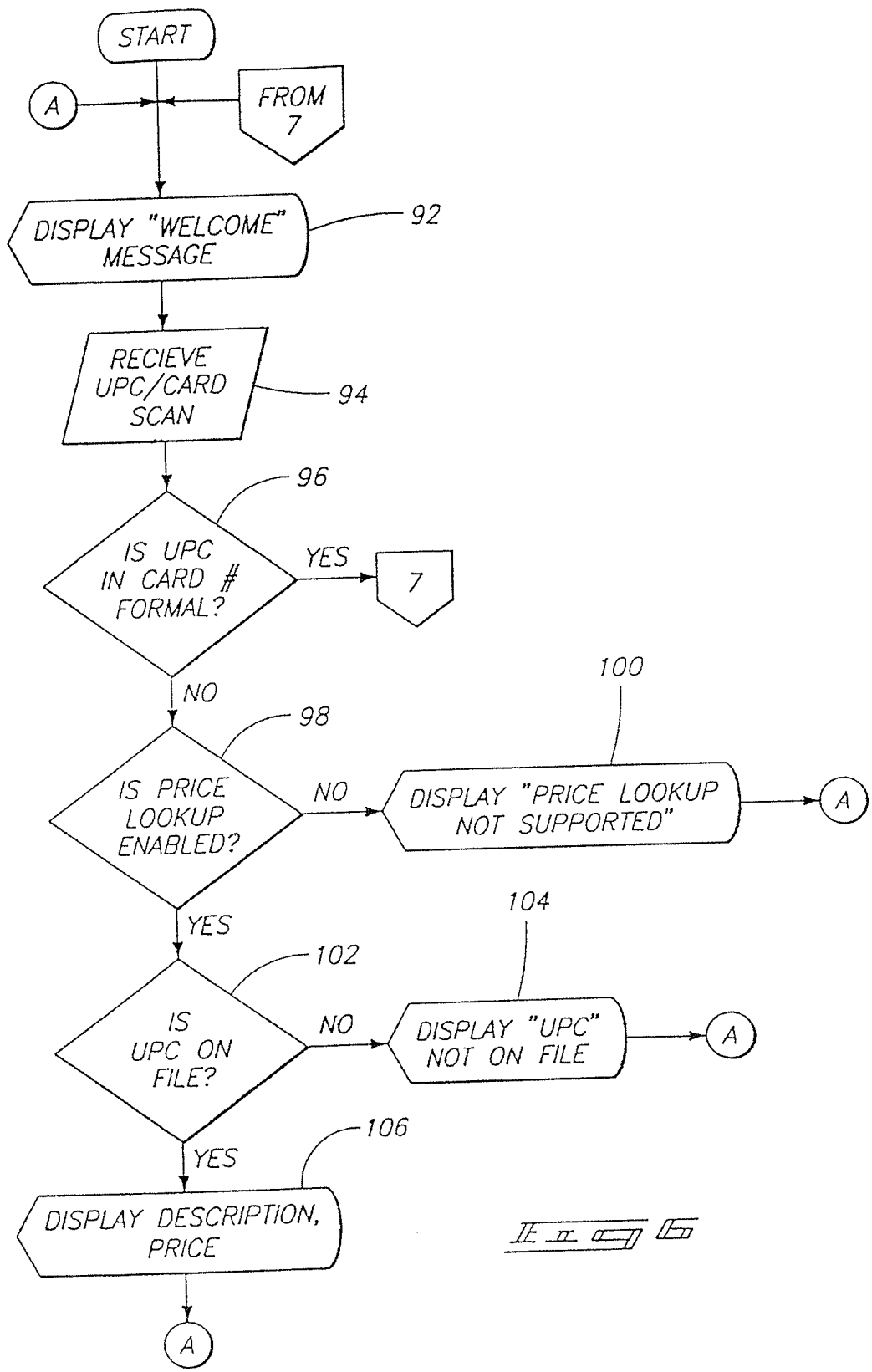
Figure 7:
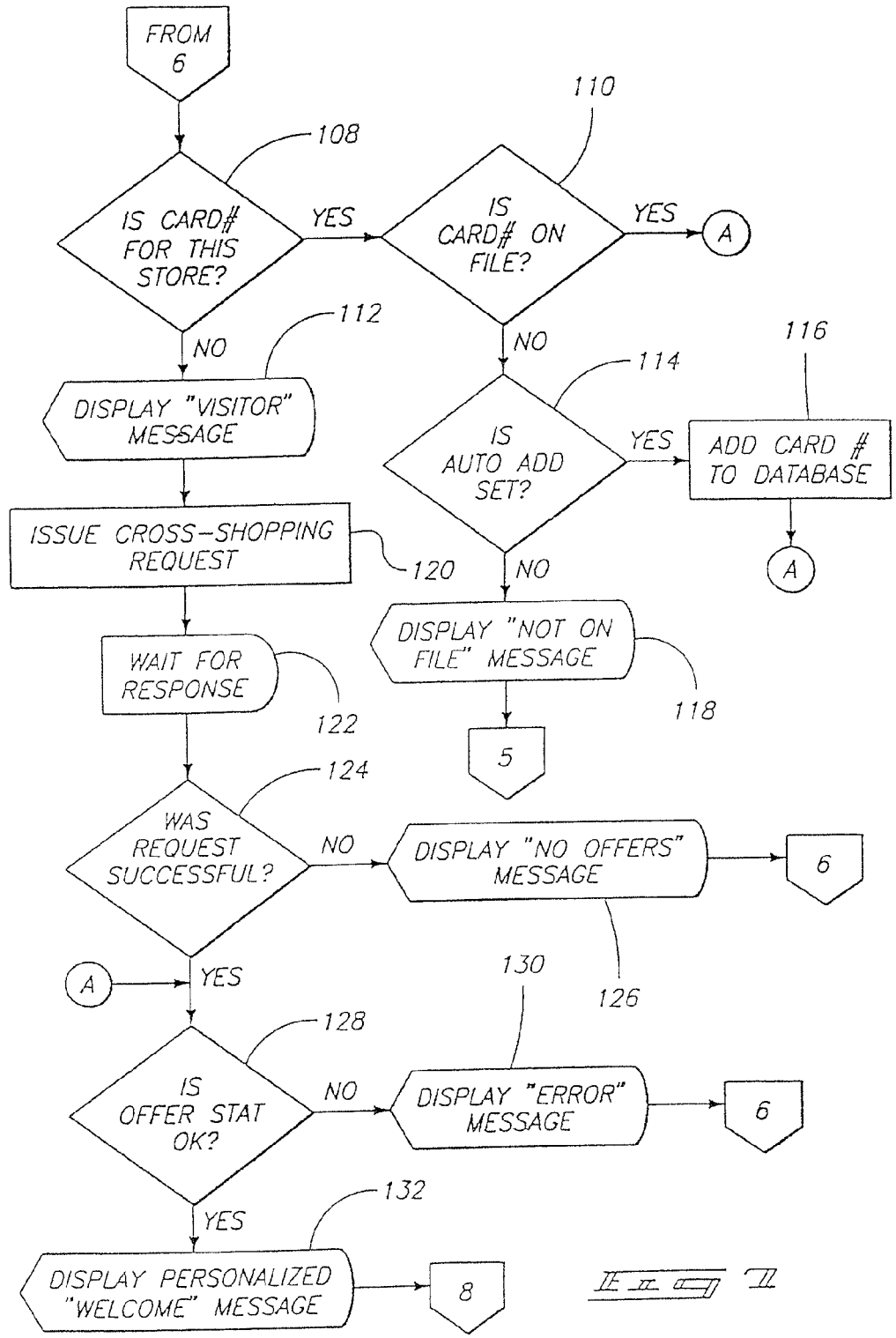
Figure 8:
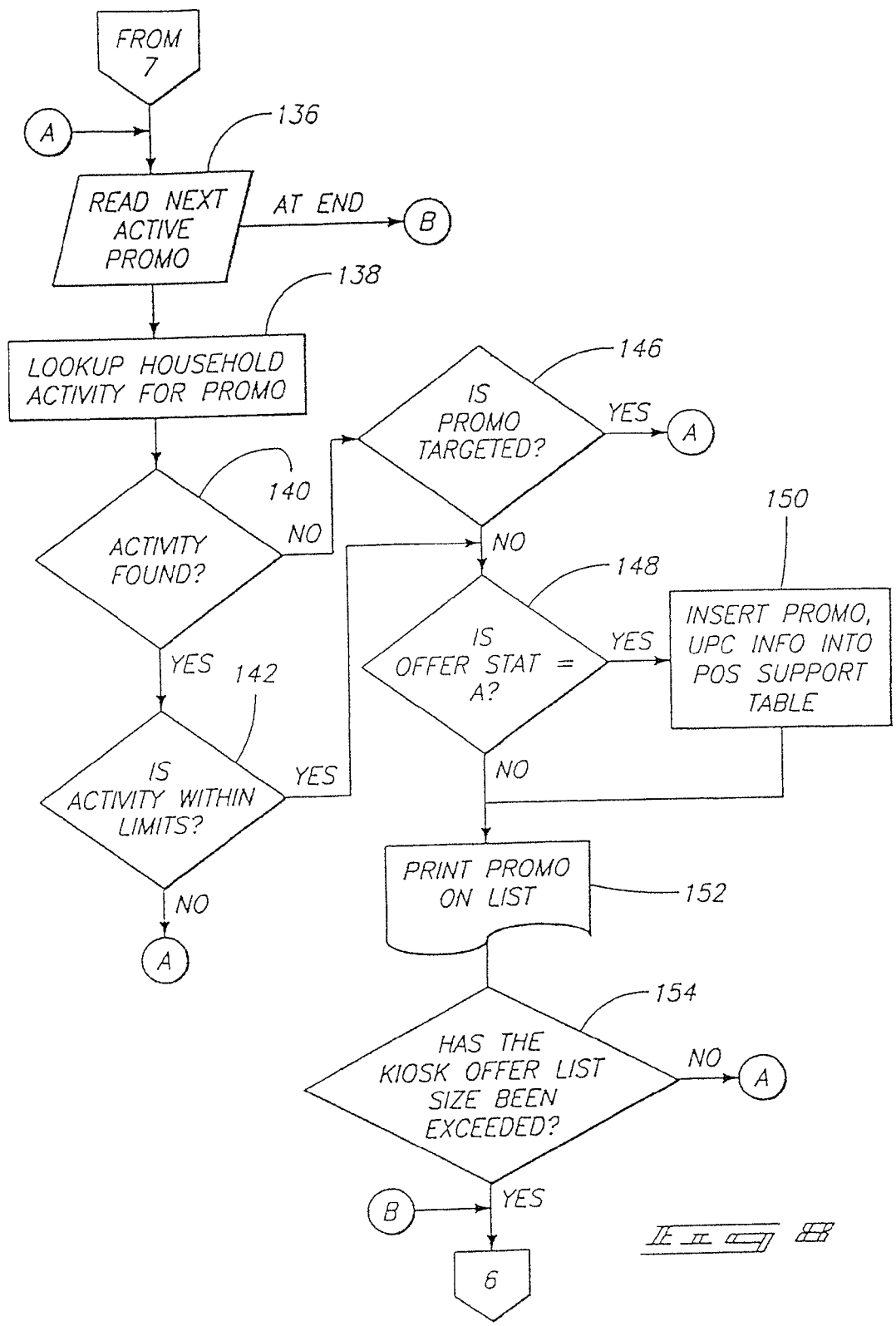
Figure 9:
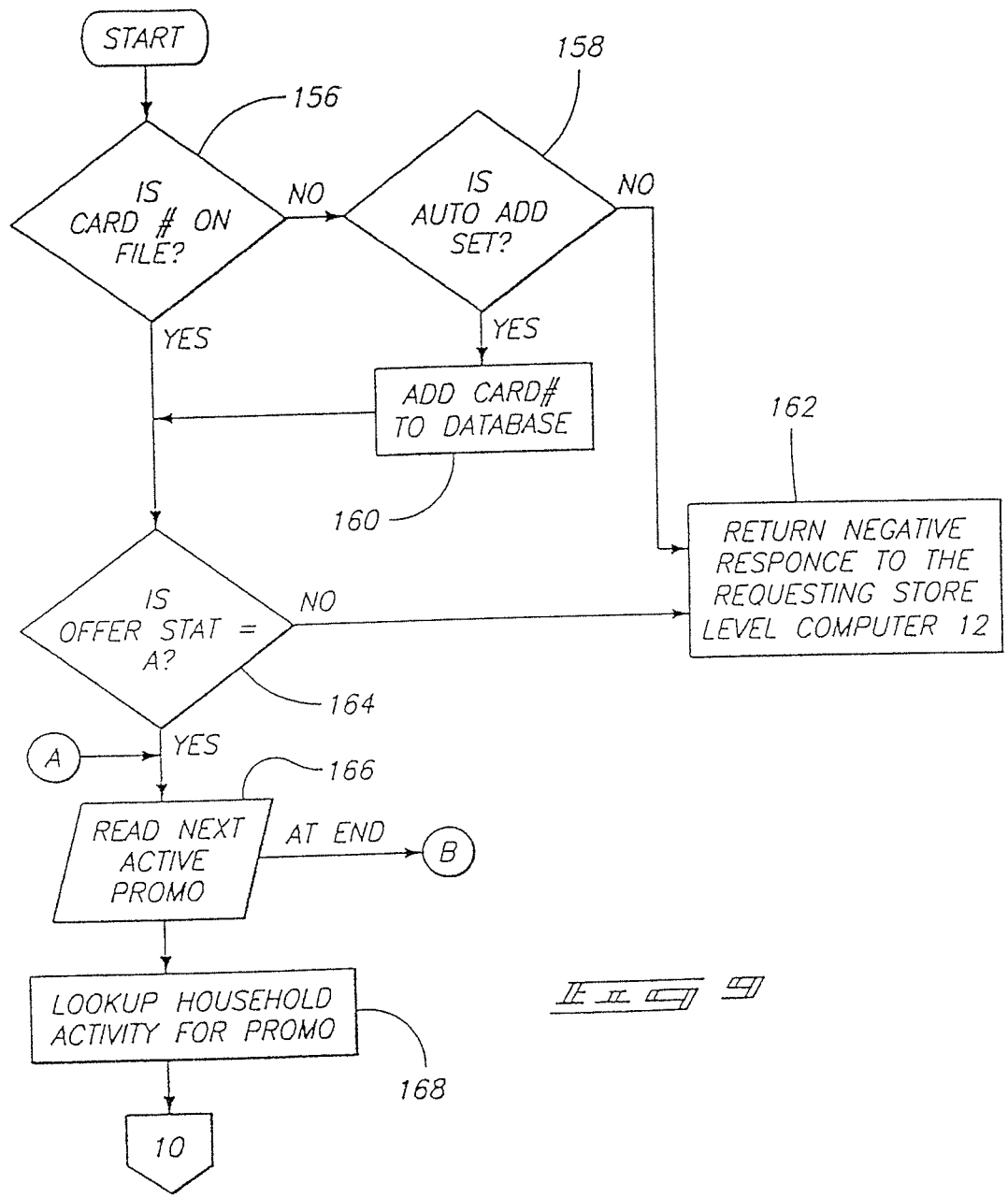
Figure 11B:
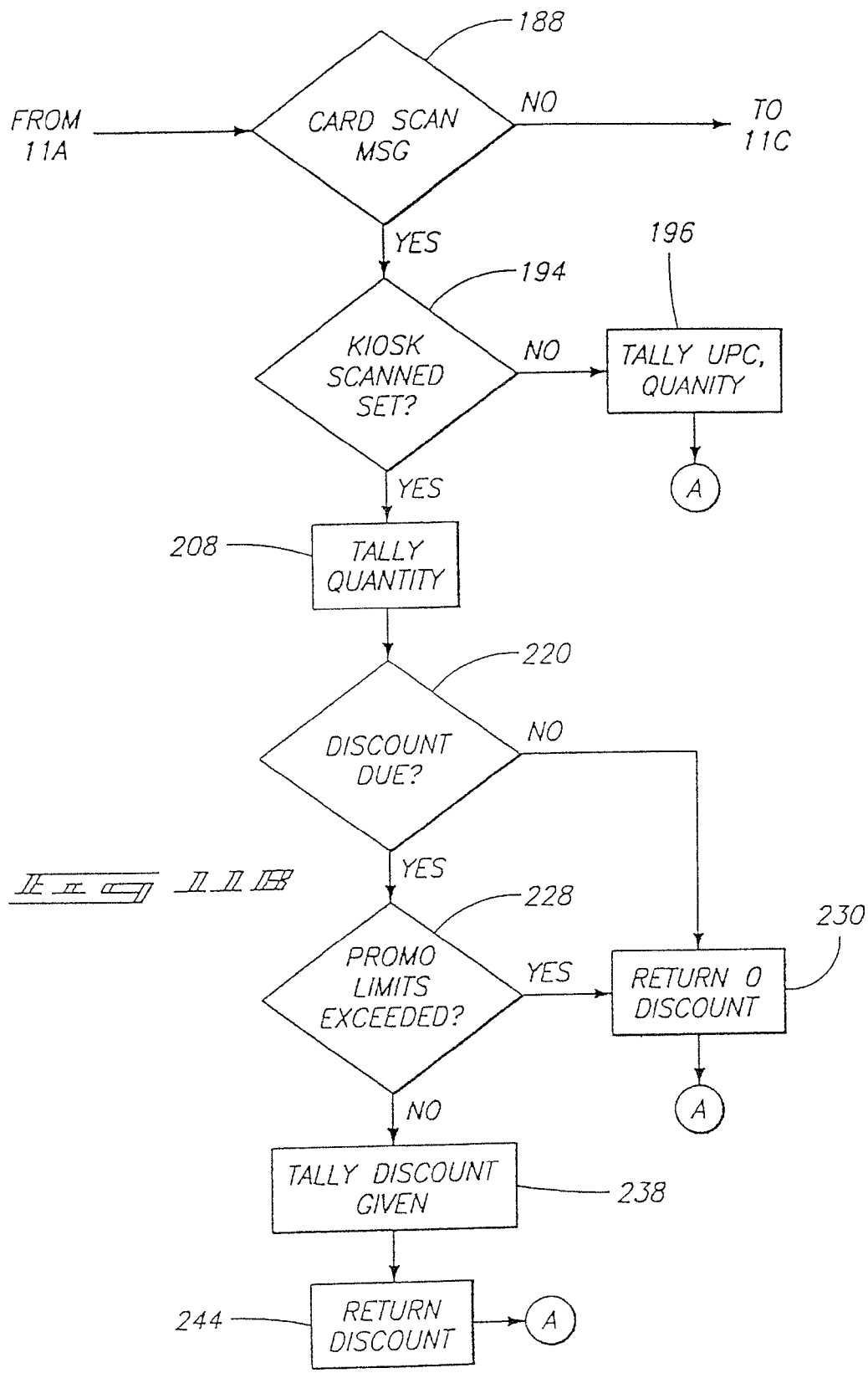
FIG. 11 consists of FIG. 11A, FIG. 11B, and FIG. 11C, and are flow charts illustrating processing that takes place at a store level computer when a check-out sends a message to the store level computer.
Figure 12:
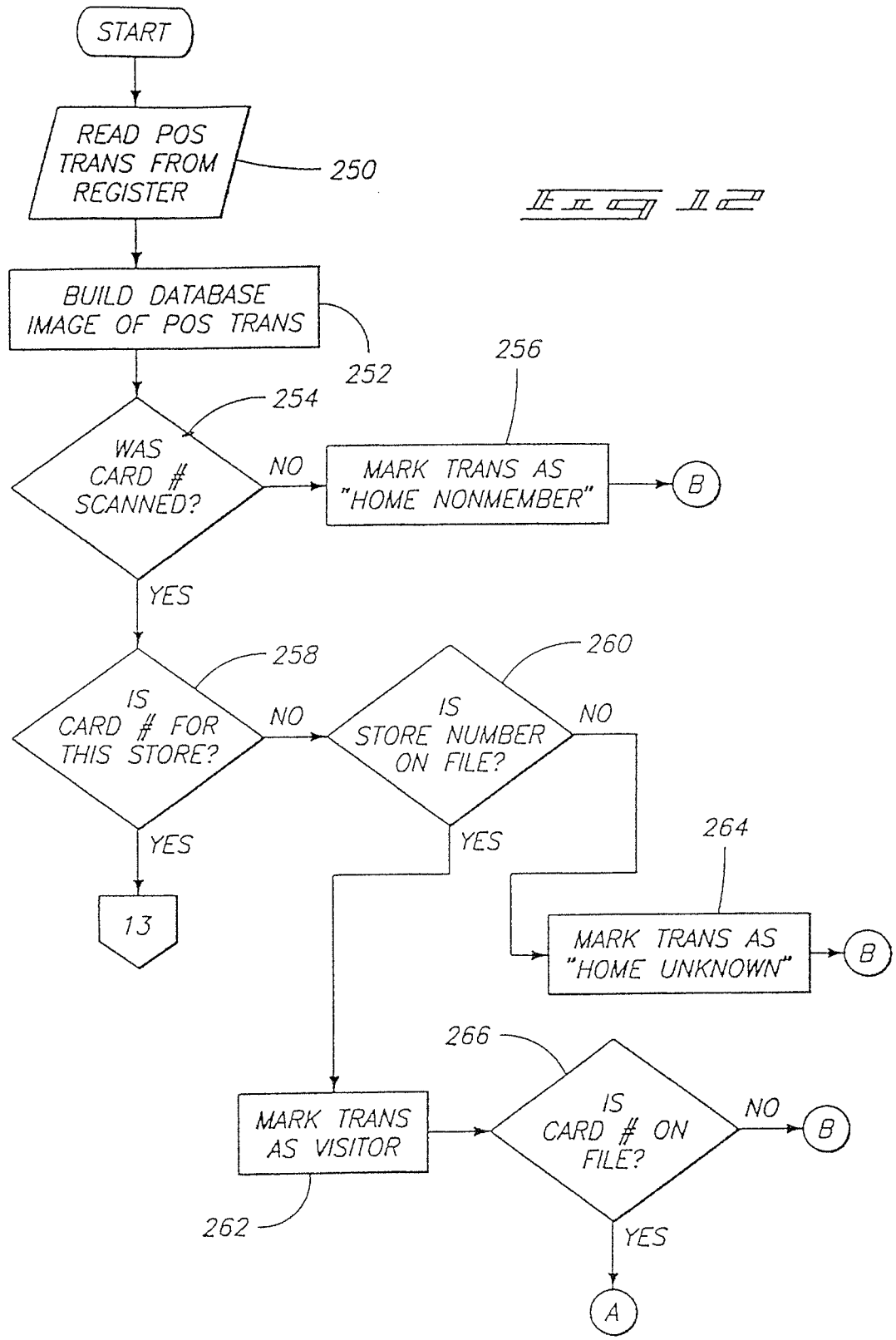
FIGS. 12-14 are flow charts illustrating transactional analysis that takes place at a check-out (point of sale terminal).
Figure 13:
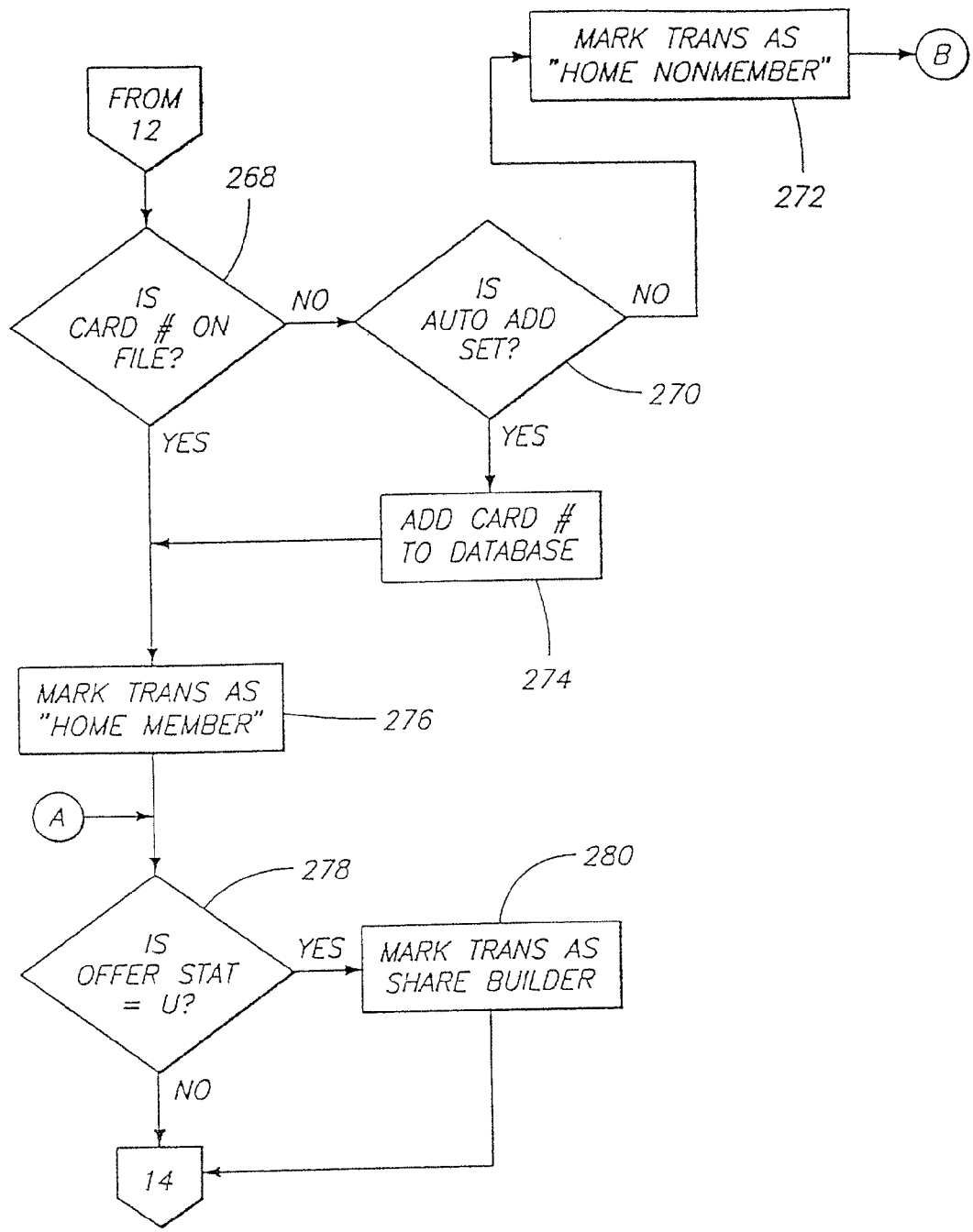
Figure 14:
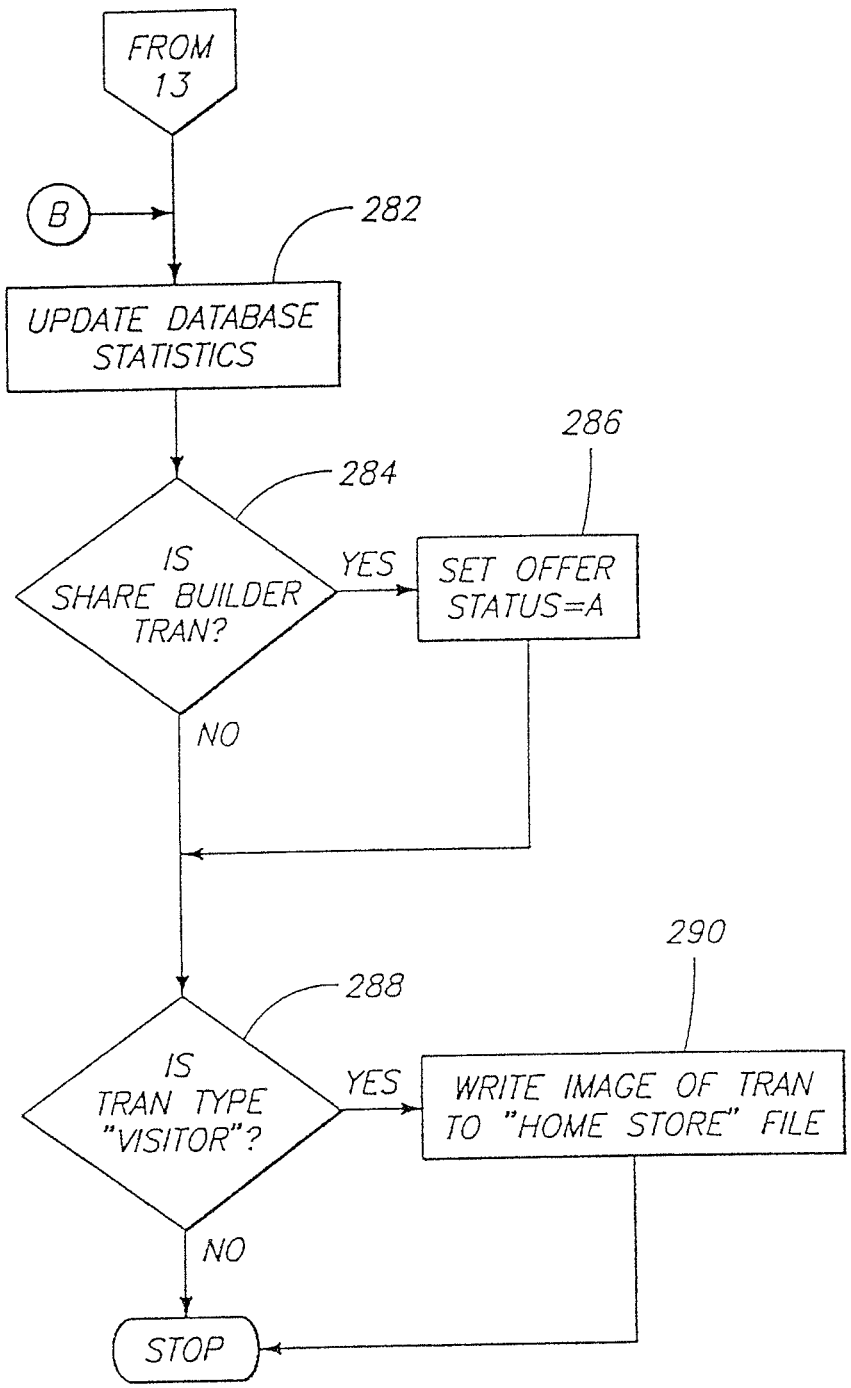
Figure 15:
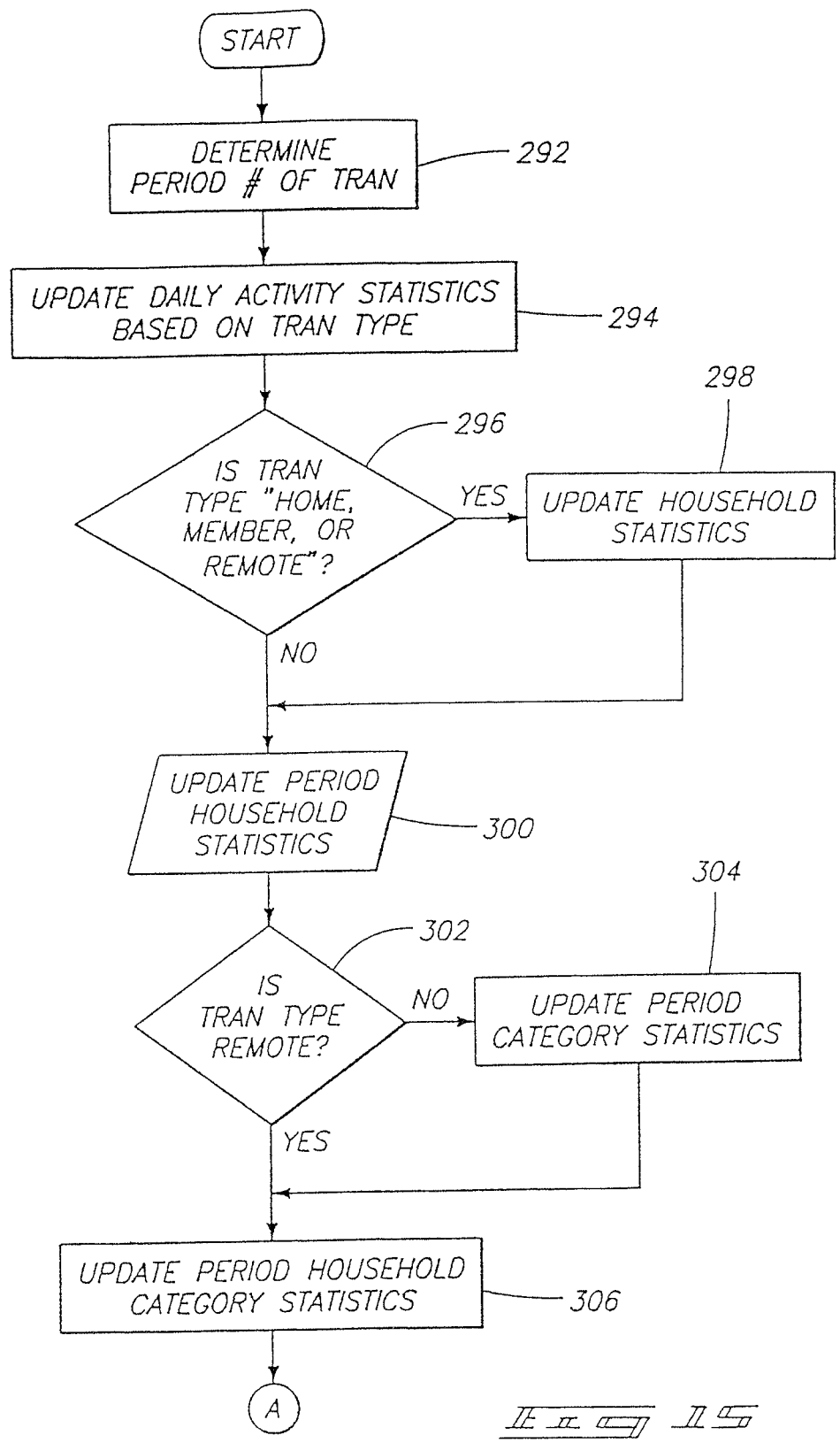
Figure 16:
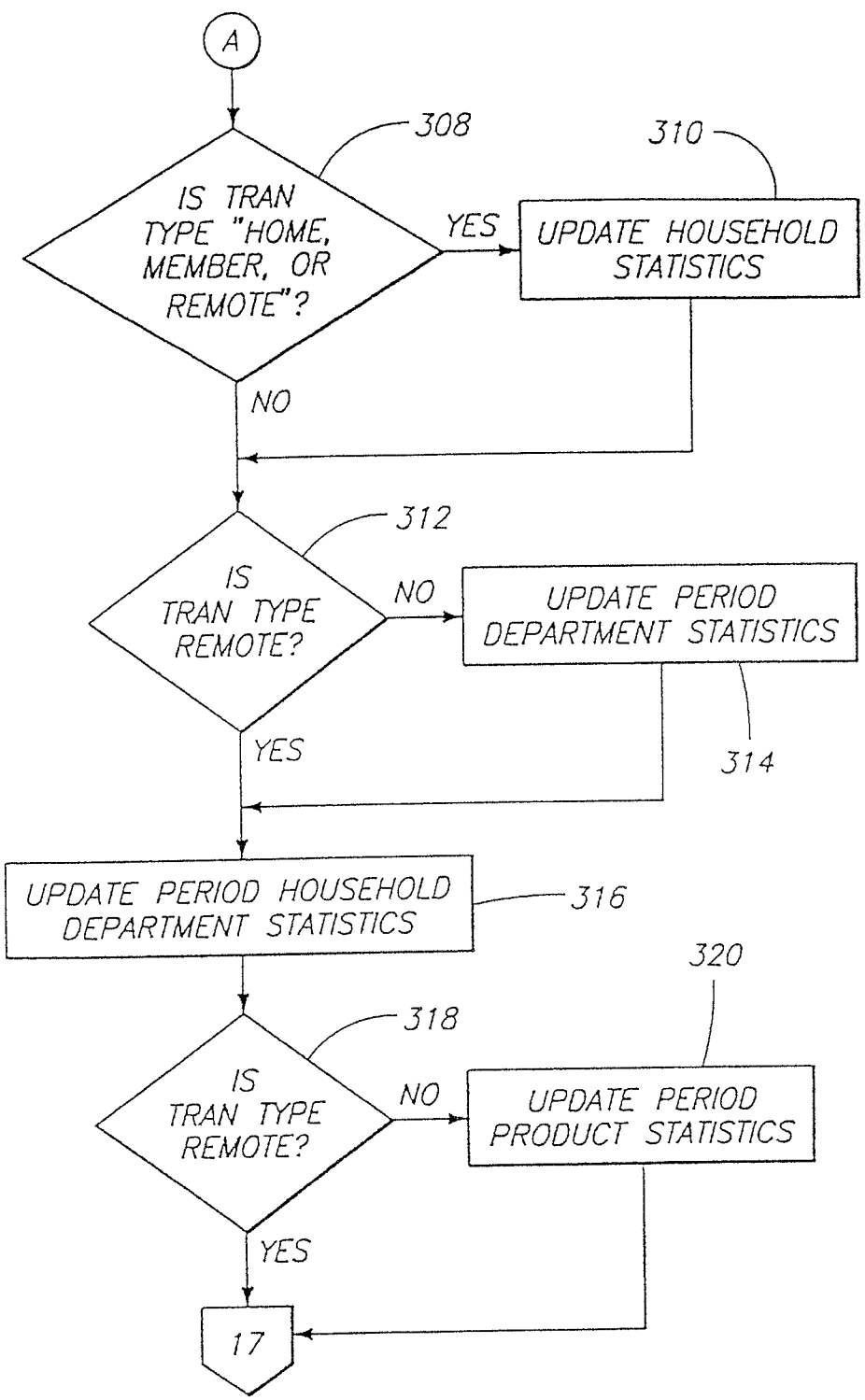

FIGS. 2-3 are flow charts illustrating store level 14 promotional staging. This staging operation is used to tell the system 10 which products to discount. Category exclusivity is provided. Any of the computer systems (14, 20, or 16) containing the customer purchase history may be used to target recipients of a promotion. If targeting takes place anywhere other than on a store level computer, either the list of targeted customers is transmitted to each appropriate store level computer, or the targeting process itself must be repeated at each store level computer.

What is claimed is:

1. A method performed by a processor which executes the method embodied as computer program code stored on a non-transitory computer useable medium, the method comprising:
   receiving a dimensional database comprising a first plurality of tables comprising at least one first table comprising inventory items offered for sale at a reduced price, each of a second plurality of the first plurality of tables comprising a plurality of rows having at least one identifier attribute identifying the inventory items offered for sale at a reduced price, the second plurality comprising a third table comprising a plurality of rows, each of the plurality of rows of the third table comprising a reference to a row of at least one other table in the dimensional database;
   following the receiving step:
   fashioning at least one second table responsive to the at least one identifier attribute of at least one of the at least one first table of the dimensional database;
   responsive to the identifier attribute of at least one row of the at least one second table, picking at least one row from the at least one first table of the dimensional database and a table produced responsive to at least a portion of the at least one first table of the dimensional database;
   receiving an identifier of a first input table comprising at least a portion of one of the at least one first table, the first input table comprising a plurality of rows, at least one row of the first input table consisting of at least one selected from an item effective identifier and a user effective identifier; and
   fashioning the third table comprising at least one row consisting of at least one selected from at least one identifier corresponding to the item effective identifier from at least one row of the first input table and at least one identifier corresponding to the user effective identifier from the at least one row of the first input table.

2. The method of claim 1 wherein the picking step comprises joining at least one row from the one selected from the at least one first table of the dimensional database with the table produced from the at least one first table of the dimensional database.

3. The method of claim 1 wherein the picking step comprises selecting at least one row from the one selected from the at least one first table of the dimensional database and the table produced from the at least one first table of the dimensional database.

4. The method of claim 1 comprising the additional step of picking, independently of the second table, at least one row from a table selected from at least one of the at least one first table of the dimensional database and the table produced responsive to the at least one first table of the dimensional database.

5. The method according to claim 4 additionally comprising the step of fashioning at least intermediate table from at least one of the at least one second table; and
   wherein the picking step responsive to the portion of the at least one second table is additionally responsive to the at least one intermediate table.

6. A method performed by a processor which executes the method embodied as computer program code stored on a non-transitory computer useable medium, the method comprising:
   receiving a dimensional database comprising a first plurality of tables comprising at least one first table comprising inventory items offered for sale, each of a second plurality of the first plurality of tables comprising a plurality of rows having at least one identifier attribute identifying the inventory items offered for sale at a reduced price, the second plurality comprising a third table comprising a plurality of rows, each of the plurality of rows of the third table comprising a reference to a row of at least one other table in the dimensional database;
   following the receiving step:
   fashioning at least one second table responsive to the at least one identifier attribute of the at least one first table of the dimensional database;
   responsive to the identifier attribute of the at least one second table, picking at least one row from one selected from the at least one first table of the dimensional database and a table produced responsive to at least a portion of the at least one first table of the dimensional database;
   receiving an identifier of a first input table comprising at least a portion of one of the at least one first table, the first input table comprising a plurality of rows, at least one row of the first input table consisting of at least one selected from an item effective identifier and a user effective identifier; and
   fashioning the third table comprising at least one row consisting of at least one selected from at least one identifier corresponding to the item effective identifier from the at least one row of the first input table and at least one identifier corresponding to the user effective identifier from the at least one row of the first input table.

7. The method of claim 6 comprising the additional step of delivering the third table to a user corresponding to the user effective identifier.

8. The method of claim 6 wherein the delivery step comprises delivery of a computer-readable copy of the third table to the corresponding user.

9. The method of claim 6 wherein the delivery step comprises delivery of a printed copy of the third table to the corresponding user.

10. A method of improving customer relations performed by a processor which executes the method embodied as computer program code stored on a non-transitory computer useable medium, said method comprising:
    receiving a dimensional database consisting essentially of at least one first table consisting of a plurality of rows having at least one inventory item attribute identifying an inventory item offered for sale and at least one customer identifier attribute comprising a customer identifier;
    following the receiving step:

fashioning at least one second table responsive to the at least one inventory item attribute and the at least one customer identifier attribute of the at least one first table of the dimensional database;

receiving an inventory item identifier of a first input table consisting essentially of at least a portion of one of the at least one first table, the first input table comprising a plurality of rows, at least one row of the first input table comprising the inventory item identifier;

fashioning a third table comprising at least one row consisting of the inventory item identifier from the at least one row of the first input table, the at least one inventory item attribute from at least one row of the second table, and the at least one customer identifier attribute from the at least one row of the second table; and informing the customer corresponding to the at least one customer identifier attribute of the third table of the data in said third table.

11. The method of claim 10 wherein the step of fashioning the at least one second table comprises an input of the at least one inventory item attribute and an input of the at least one customer identifier attribute corresponding therewith.

\* \* \* \* \*